United States Patent [19]
Umeda et al.

[11] Patent Number: 5,224,090
[45] Date of Patent: Jun. 29, 1993

[54] OPTICAL RECORDING MEMBERS AND METHOD FOR PRODUCTION THEREOF

[75] Inventors: Kazuo Umeda, Setagaya; Masaaki Asano, Shinjuku; Minoru Utsumi, Yokohama; Takuya Hamaguchi, Hoya; Takeshi Matsumoto; Yuji Kondo, both of Shinjuku, all of Japan

[73] Assignee: Dai Nippon Insatsu Kabushiki Kaisha, Japan

[21] Appl. No.: 943,150

[22] PCT Filed: Sep. 25, 1987

[86] PCT No.: PCT/JP87/00703
§ 371 Date: Sep. 22, 1988
§ 102(e) Date: Sep. 22, 1988

[87] PCT Pub. No.: WO88/05592
PCT Pub. Date: Jul. 28, 1988

Related U.S. Application Data

[63] Continuation of Ser. No. 254,658, Sep. 22, 1988, abandoned.

[30] Foreign Application Priority Data

Jan. 24, 1987 [JP] Japan .................................. 62-14840
Mar. 20, 1987 [JP] Japan .................................. 62-66751
Jun. 8, 1987 [JP] Japan .................................. 62-143010

[51] Int. Cl.$^5$ ............................................. G11B 3/70
[52] U.S. Cl. .................................... 369/284; 369/283; 369/275.1; 369/286; 369/288
[58] Field of Search ............... 369/275.1, 275.2, 275.3, 369/275.5, 280, 282, 283, 284, 286, 288; 360/2

[56] References Cited

U.S. PATENT DOCUMENTS

| | | | |
|---|---|---|---|
| 4,245,229 | 1/1981 | Stephens | 346/135.1 |
| 4,318,112 | 3/1982 | Kivits et al. | 369/284 X |
| 4,385,303 | 5/1983 | Akahira et al. | 369/280 X |
| 4,439,485 | 3/1984 | Takemura et al. | 346/135.1 X |
| 4,913,949 | 4/1990 | Steininger et al. | 369/288 X |
| 4,920,359 | 4/1990 | Arai et al. | 369/286 X |

Primary Examiner—Eugene R. LaRoche
Assistant Examiner—Tan Nguyen
Attorney, Agent, or Firm—Parkhurst, Wendel & Rossi

[57] ABSTRACT

The optical recording member according to the present invention includes an information recording pattern consisting of high reflectance portions and low reflectance portions formed on a substrate. During reading of information, discrimination of recording information is done by detecting the difference in light reflectance between the above respective portions. In this case, the low reflectance portions are roughened on their surface and have light scattering property, and therefore the difference in light reflectance can be well detected. Further, the method for preparing the optical recording member according to the present invention can be practiced according to relatively simple means of the surface roughening step of the above low reflectance portions and yet according to a precise and rapid method, and therefore it is suitable for bulk production on an industrial scale.

16 Claims, 20 Drawing Sheets

OPTICAL RECORDING MEMBERS AND METHOD FOR PRODUCTION THEREOF

This is a continuation of application Ser. No. 07/245,658 filed Sep. 22, 1988, now abandoned.

TECHNICAL FIELD

This invention relates to optical recording members capable of recording optical information and more particularly to optical recording members of the read-only-memory (ROM) type which read an information bit with a laser beam, the direct-read-after-write (DRAW) type capable of writing information with a laser beam, and the type capable of erasing and writing, and to a method for producing the same.

BACKGROUND ART

In the prior art, as the recording material embedded in cards such as credit cards, bank cards, etc., magnetic recording materials have been primarily used. While such magnetic recording materials have the advantage that writing and reading of information can be easily performed, and forging of information can be effected with relative ease, there is the problem that high-density information recording cannot be achieved.

In recent years, from the standpoint of the recording and reproduction of high-density information, development of IC cards and optical cards has been progressing. Among them, optical cards using optical recording and reproduction systems have the advantage that the information density recorded is substantially higher when compared to that of the magnetic system of the prior art or that by the IC system.

In this connection, as the optical recording member or the optical recording material to be used for such an optical card, there have been proposed in the prior art those as described below.

For example, the example shown in FIG. 18A is an example of an optical recording member of the so-called ROM (read only memory) type. In this case, on the optical card 50 is formed an optical recording member constituted of a high reflectance portion 51 and a low reflectance portion 52, with the information recording bit constituted of the low reflectance portion 52. FIG. 18B is a sectional view of said optical card 50, having a light reflective material 55 corresponding to an information recording pattern formed on a transparent substrate 54 according to photolithography, while a member having a black printed layer 57 on a base material 58 is bonded through and adhesive layer 56 to form the optical card 50. Therefore, in this case, the reading of information is performed by detecting the difference in light reflectance between the light reflective material 55 and the printed layer 57.

FIG. 19 is an example of an optical recording member of the ROM type disclosed in Japanese Patent Publication No. 48357/1983, and in the case of this example, an information recording bit 62 with a light reflectance differing from the surrounding portion 61 is formed by effecting pattern exposure and development corresponding to the recording information on the film of a silver halide emulsion formed on a certain base material.

On the other hand, the example shown in FIG. 20 is an example of an optical recording member of the so-called DRAW type (direct-read-after-write type) which can "directly read after writing". In this case, one surface of the photopolymer 71 is formed in uneven shape, a thin film of an optical recording material 72 such as Te, etc., is provided along the uneven surface, which is then bonded to the substrate 74 with an adhesive 73, and at the same time on the upper surface of the polymer 71 is laminated a light-transmissive acrylic resin, etc., to constitute an optical recording member. Writing of information onto the optical recording member is effected, as shown in FIG. 21, by scanning the uneven portion of the optical recording material 72 with an irradiated laser beam 76 to confirm the position by focusing on, for example, the convex portion, and thereafter writing the bit information at the convex portion of the optical recording material 72.

To describe an optical recording member of the DRAW type of the prior art disclosed in Japanese Patent Publication No. 48357/1983 by referring to FIG. 22, in this case, a film 80 of a silver halide emulsion is formed on a base material, and pattern exposure and development are effected on the film 80, thereby forming 81 and 82 with different light reflectances. Bit information is written on the portion 81 by confirming the position of the portion 81 through the difference in light reflectance.

However, according to the best of our knowledge, the optical members of the prior art as described above are all have relatively cumbersome preparation steps, and when production and copying are performed in large amounts, they cannot necessarily be said to be economical methods. Also the optical members obtained are not yet sufficiently satisfactory with respect to long-term storability durability.

For example, in the optical recording member shown in FIG. 18 as mentioned above, since patterning of the light reflective material is effected by wet etching with a strong acid, etc., the steps of washing the etchant and drying are cumbersome and take a long time, and also if washing is insufficient, corrosion will proceed with lapse of time after completion to shorten the life of the optical recording member. Also, pH management of the etchant is generally difficult, and further there is also involved the problem that troubles may be generated due to impurities in the etchant.

Also, in the optical recording medium shown in FIG. 19, since a certain degree or higher of precision is required for the height and the width in formation of a convex surface, it has the problem that the method for controlling such precision will become necessarily difficult, and for the purpose the preparation steps will become complicated to involve the problem of increased cost.

Also, in the optical recording member shown in FIG. 22 as mentioned above, because only precision is required for the width of the track, production can be performed more easily than that of the optical recording member in FIG. 20 as mentioned above, but since a specific photographic material of a special silver halide emulsion, etc. is required, there is involved the problem that the production cost is increased.

DISCLOSURE OF THE INVENTION

The present invention has been accomplished in view of the problems of the prior art as described above, and its objects are as follows:

(a) to provide an optical recording member the steps of production of which are simplified and accelerated in time, which is particularly suitable for bulk copying on an industrial scale, and a method for producing the same;

(b) to provide an optical recording member the production starting materials of which are not limited to specific optical recording materials but can be selected from materials of relatively various kinds, and also production cost of which is reduced, and to provide a method for producing the same; and (c) to provide an optical recording member having excellent long-term storability, durability and stability and a method for producing the same.

The present inventors have studied intensively in order to accomplish the above objects and consequently found that in an optical recording member which performs detection of recording information through the difference in light reflectance, by a relatively simple means of constituting the low reflectance portion with a portion subjected to surface roughening, unexpectedly precise and good optical recording information can be made, which is also extremely advantageous in bulk copying on an industrial scale, to accomplish the present invention.

More specifically, the optical recording member according to the present invention is an optical recording member comprising an information recording pattern discriminable through the difference in light reflectance formed on a base material, said information recording pattern being constituted of a high reflectance portion and a low reflectance portion, said low reflectance portion comprising a roughened surface portion having light scattering property.

Also in a specific embodiment of the above optical recording member of the present invention, a light reflective material layer or an optical recording material layer may be also laminated on the whole surface or a part of the base material so as to cover the roughened surface portion formed on the above base material.

On the other hand, the method for producing the optical recording member according to the present invention comprises, in preparing an optical recording member having an information recording pattern constituted of the high reflectance portion and the low reflectance portion formed on the base material, forming said low reflectance portion according to the surface roughening treatment corresponding to the information recording pattern.

BEST MODES FOR PRACTICING THE INVENTION

Figure 1A:
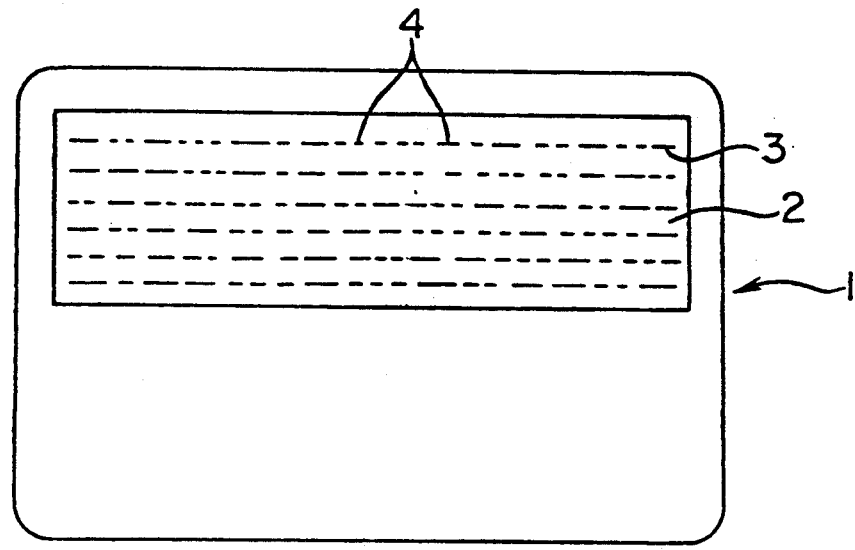
FIG. 1 comprises illustrations showing an optical card of the ROM type which is an example of the optical recording member of the present invention, FIG. 1A being a plan view, FIG. 1B a perspective view.

In the following, the present invention is described in detail by referring to specific examples shown in the drawings.

Figure 1B:
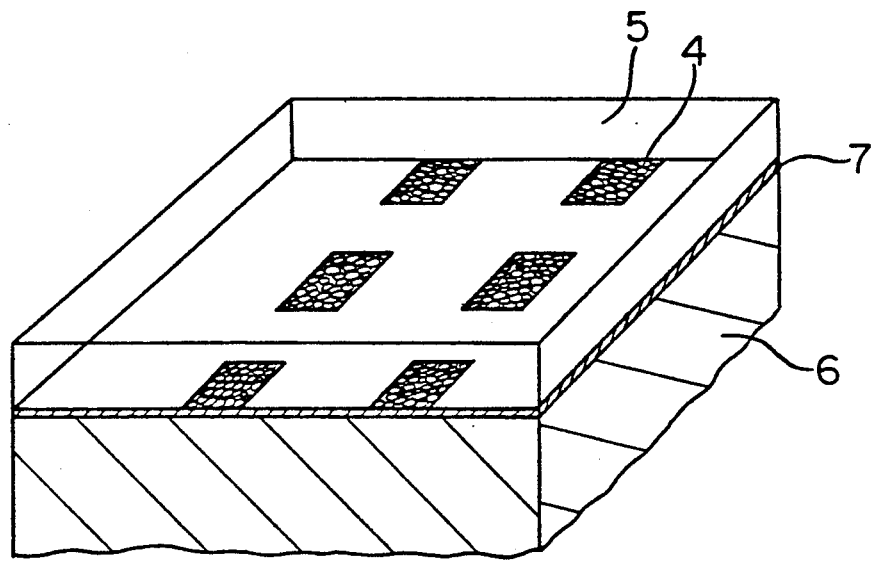
Figure 2:
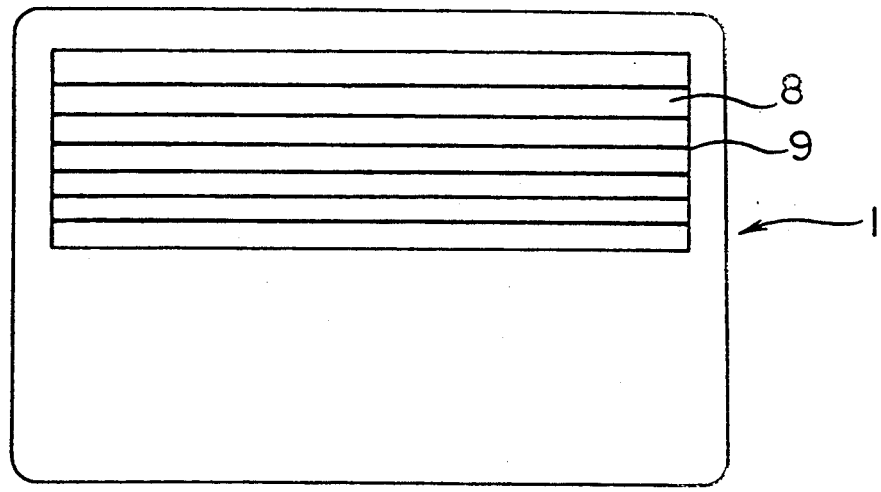
FIG. 2 is an illustration of an optical card of the DRAW type which is another example of the optical recording member of the present invention.

FIG. 1 is a drawing showing an optical card of the ROM type which is an embodiment of the optical recording member of the present invention, FIG. 1A being a plan view and FIG. 1B a perspective view. FIG. 2 is a drawing showing an optical card of the DRAW type which is another example of the optical recording member of the present invention, FIG. 3 a drawing showing an optical card by use of both the ROM type and DRAW type which is similarly another example, FIG. 4 a drawing for illustration of an example of the method for preparation of the optical recording member of the present invention, FIGS. 5, 6, 7, 8, 9, 10 and 11 are drawings for illustration of other examples of the method for preparation of the optical recording member of the present invention, and FIG. 12 is a drawing for illustration of the writing system of the optical recording member of the present invention.

FIG. 1 is a drawing showing an example when the optical recording member of the present invention is constituted as an optical card of ROM type, and on the optical card 1 is formed an information recording bit 4 comprising a low reflectance portion 3 relative to a high reflectance portion 2. The optical card 1 can form a light reflective material layer 7 between the transparent base material 5 and the card substrate 6 as shown in FIG. 1B, and on said light reflective material layer 7 is formed an information recording bit 4 with its surface being roughened (fine unevenness shape).

FIG. 2 is a drawing showing an optical card of DRAW type as the optical recording member of the present invention, and on the optical card 1 are formed optical recording tracks 8 which form the high reflectance portion and can be written in by light and guide tracks 9 which form the low reflectance portion. In the above example, the optical recording tracks 8 and the guide tracks 9 are formed alternately, but it is also possible to reduce the number of the guide tracks 9. Also, a preformat with the low reflectance portion as the bit may also be formed.

Figure 3:
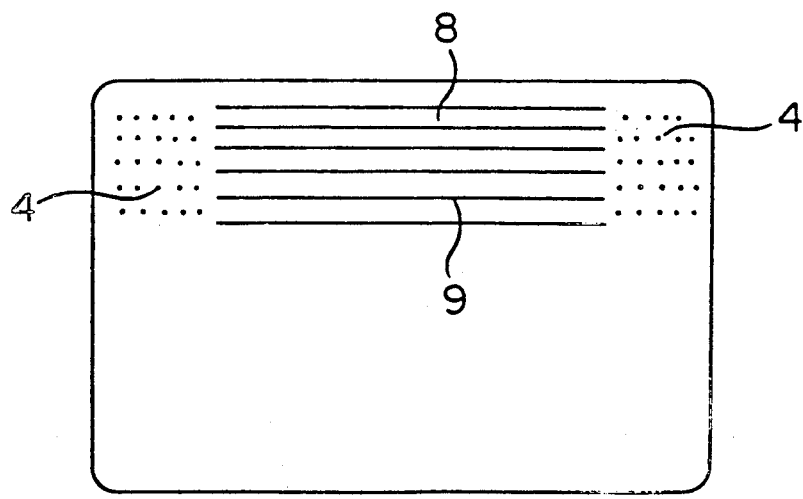
FIG. 3 is an illustration showing an optical card using both the ROM type and the DRAW type which is similarly another example.

FIG. 3 is a drawing showing an optical card produced by using both the ROM type of FIG. 1 and the DRAW type of FIG. 2, and for example, on the right and left of the optical card 1 are formed information recording bits 4, 4 and at the central portion are formed optical recording tracks 8 and guide tracks 9. The information recording bits 4 and the optical recording tracks 8 can be set at any desired positions.

FIGS. 4 to 11 show examples of the method for preparation of optical recording members of the above ROM type or DRAW type. In the drawings, the high reflectance portion 13b and the low reflectance portion 13c are illustrated in uneven shape, and there unevenness differences are generally about 1,000 Å to several μm, thus being formed practically in substantially a planar shape or as the same plane.

Figure 13:
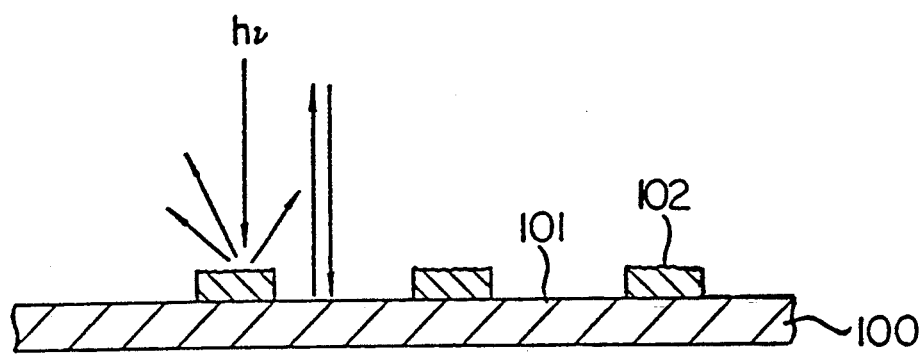
FIGS. 13 and 14 are respectively conceptional sectional views of the optical recording member according to the present invention.

Both of the examples shown in FIGS. 2 and 3 as described above are examples in which the optical recording member is constituted as the optical card, but the optical recording member according to the present invention comprises basically an information recording pattern with the high reflectance portion 101 and the low reflectance portion 102 formed on a certain base material 100, as shown by its conceptional sectional view in FIG. 13. During reading of its information, discrimination of the recording information is effected by detecting the difference in light reflectance of the above respective portions, and in this case, since the low reflectance portion 102 is roughened on its surface and has light scattering property, the difference in light reflectance can be well detected. On the other hand, the high reflectance portion 101 has no particular problem if the base material 100 itself has light reflectivity, but for imparting high reflectivity, a light reflective material layer (not shown) can be provided separately on the base material 100.

In the sectional view shown in FIG. 14, a low reflectance portion (roughened surface portion) 102 is formed on the side below the light-transmissive substrate 100a, and the laser beam for reading information is projected from above. In this case, a light reflective material layer (or optical recording material layer) 103 can be formed on the whole surface or a part of the base material 100a so as to cover the above roughened surface portion 102, and the light reflective material layer 103 constitutes the high reflectance portion.

Figure 14:
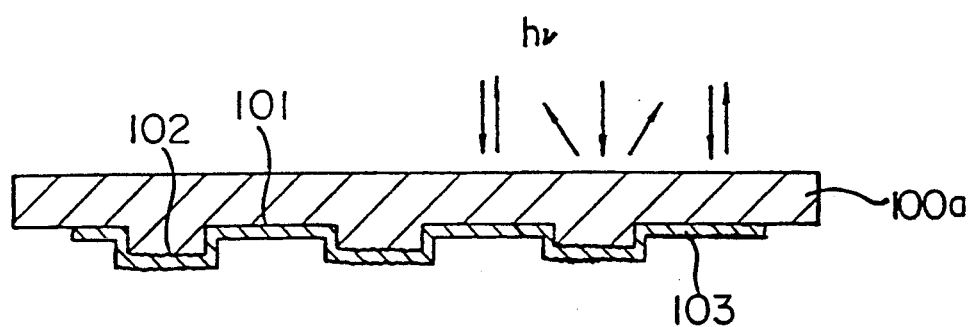
Figure 15A:
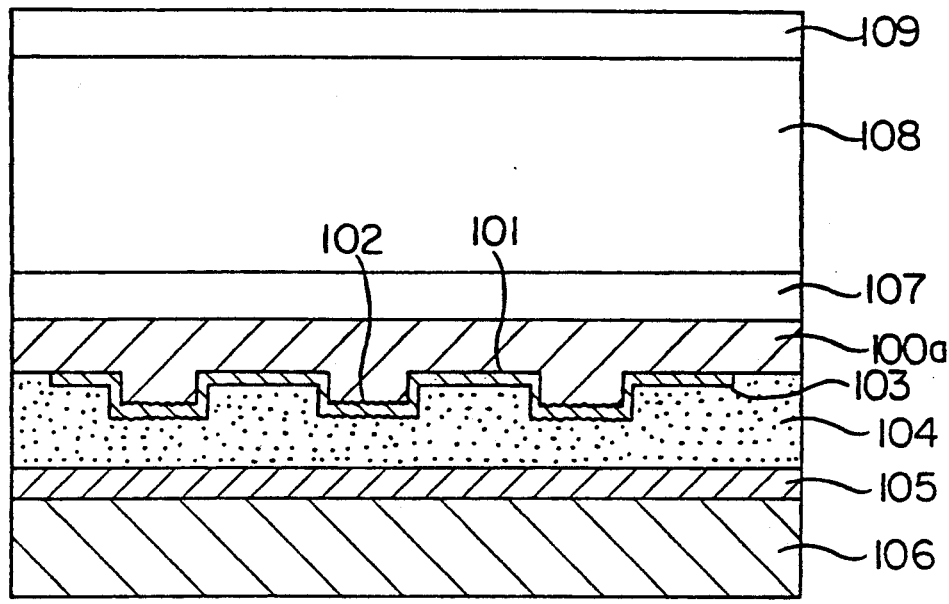
FIG. 15 comprises sectional views of the optical card according to an example of the optical member of the present invention.

The example shown in FIG. 15A is a sectional view where the optical recording member in the above FIG. 14 is constituted as an optical card, having a low reflectance portion 102 with the roughened surface of the light-transmissive base material 100a and a light reflective material layer or an optical recording material layer 103 laminated on the surface of the base material 100a so as to cover the low reflectance portion. Further, on the surface are laminated an adhesive layer 104, a printing layer 105 and a card base material 106, while on the opposite side are formed by lamination by way of a primer layer 107 a transparent base material layer (protective layer) 108 and a surface hardened layer 109.

Further, 15B is an example of the case where in the above case of 15A, the light-transmissive base material 100a is formed in a mode in which it also functions as the protective layer of the optical card. As the above light-transmissive base material 100a, any desired material such as plastic sheet or film can be selected depending on the use, the final purpose of the product. Further, on the base material 100a, other recording means such as magnetic stripe, hologram, imprint, photography, bar code, printing in general may also be formed.

Figure 15B:
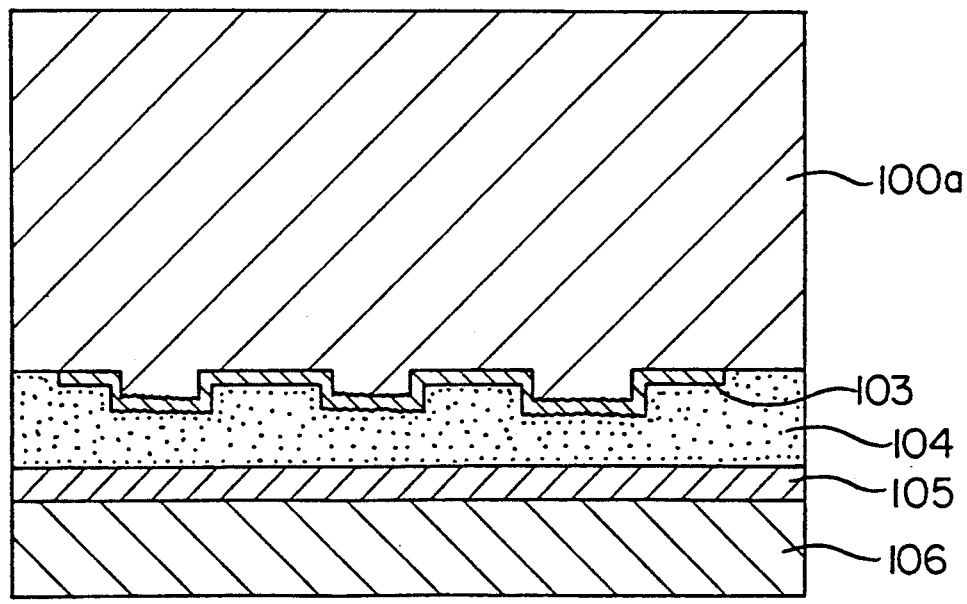

In the constitution of the above FIGS. 15A and 15B, the optical recording material layer 103 is not exposed at the end portion of the card, but it is of the sealed type without voids as a whole and therefore acquires particularly excellent stability with the elapse of time.

Next, the main constituent materials of the above optical member of the present invention will be described.

Base Material

As the base material, materials known in the prior art can be suitably used. Particularly as the light-transmissive material, resins such as polymethyl methacrylate (PMMA), polycarbonate, polyester, epoxy resin, polyolefin, and polystyrene, or glass can be used. As to details of these base materials, they are also described in detail in the production methods (I)–(X) described below.

Light Reflective Material

As the light reflective material to be used in the above ROM type, any material with a different refractive index from the base material can be used, for example, metals such as Al, Ti, Mn, Fe, Co, Ni, Cu, Zn, Se, Mo, Aq, Cd, In, Sn, Sb, Te, Pt, Au, and alloys, compounds of these, and otherwise materials with high light reflectance such as oxides, nitrides as represented by $TiO_2$, TiN, organic type dye thin films, etc.

Optical Recording Material

As the optical recording material to be used in the above DRAW type, for example, there can be employed the metal type (Ta, Bi, In, Al, C/Al, Cr/Al, Zn/Al, Si, GeSmS. etc.), chalcogen type (Te, Te-As, Te-Se, Te-Se-As, Te-$CS_2$, Te-C, Te complex, As-Se-S-Ge, etc.), oxide type ($TeO_x$, $GeO_x$, $MoO_x$, $Vo_2$, etc.), organic material type (dye thin film+resin, Ag+-polymer, thermosetting resin, Cu-Pc/Te, etc.).

As the optical recording material to be used in the type capable of erasing and writing, as the material in which the order state between the atoms constituting the film are reversibly changed by photoirradiation and the light reflectances are different between the two, for example, the materials such as Te-As, Te-Se, Te-Se-As, Te-$CS_2^-$, Te-C, As-Se-S-Ge, etc. can be employed.

Among those as mentioned above, as the optical recording material of the DRAW type of the present invention, one comprising a first layer of an oxide of tellurium represented by the formula: $TeO_x$ (x is a positive real number) and a second layer comprising an oxide of tellurium represented by the formula: $TeO_y$ (y is a positive real number) laminated, having the relationship of $x < y$ in the above formula can be preferably used in particular. Generally, in the above formula, the ranges are $0 < x \leq 1.5$ and $0.5 \leq y \leq 2$.

The optical recording material layer comprising an oxide of tellurium as described above is particularly excellent in stability, weathering resistance as the DRAW type recording layer, and excellent in recording sensitivity, reproducing sensitivity when constituting the optical recording member as an optical card of the sealed type.

In preparing the optical recording material layer as described above, the above first and second layers can be easily prepared by the reactive sputtering method, or alternatively, as other methods, the respective layers having the compositions as described above can be prepared by evaporating tellurium by vacuum vapor deposition on the base material simultaneously with irradiation of an ion beam comprising oxygen-containing gas on said base material. In all cases, the optical recording material layer can be prepared at relatively lower cost according to a simple and rapid method.

Next, the modes for producing the optical recording member of the present invention are described in detail.

Production Method (I)

In the production method according to a first embodiment of the present invention, in producing an optical recording member having formed thereon an information recording pattern constituted by the high reflectance portion and the low reflectance portion, the above low reflectance portion is formed by the surface roughening treatment corresponding to the information recording pattern, and the formation step of the low reflectance portion subjected to surface roughening corresponding to the information recording pattern comprising the following steps:

(a) the step of forming a photoresist layer on the substrate;

(b) the step of effecting the first exposure on the above photoresist layer through a mask corresponding to the information recording pattern (patterning exposure);

(c) the step of subsequently effecting the second exposure on the photoresist layer subjected to the above first exposure through a transparent member having a fine light and dark pattern formed thereon (surface roughening exposure); and (d) the step of performing development on the photoresist layer subjected to the above second exposure, thereby obtaining an information recording pattern comprising a low reflectance portion with roughened surface.

Further, in the method of the present invention, there may be also included the step of laminating the light reflective material layer or the optical recording material layer as described above on the whole surface or a part of the base material so as to cover the low reflectance portion obtained in the above steps.

Figure 4:
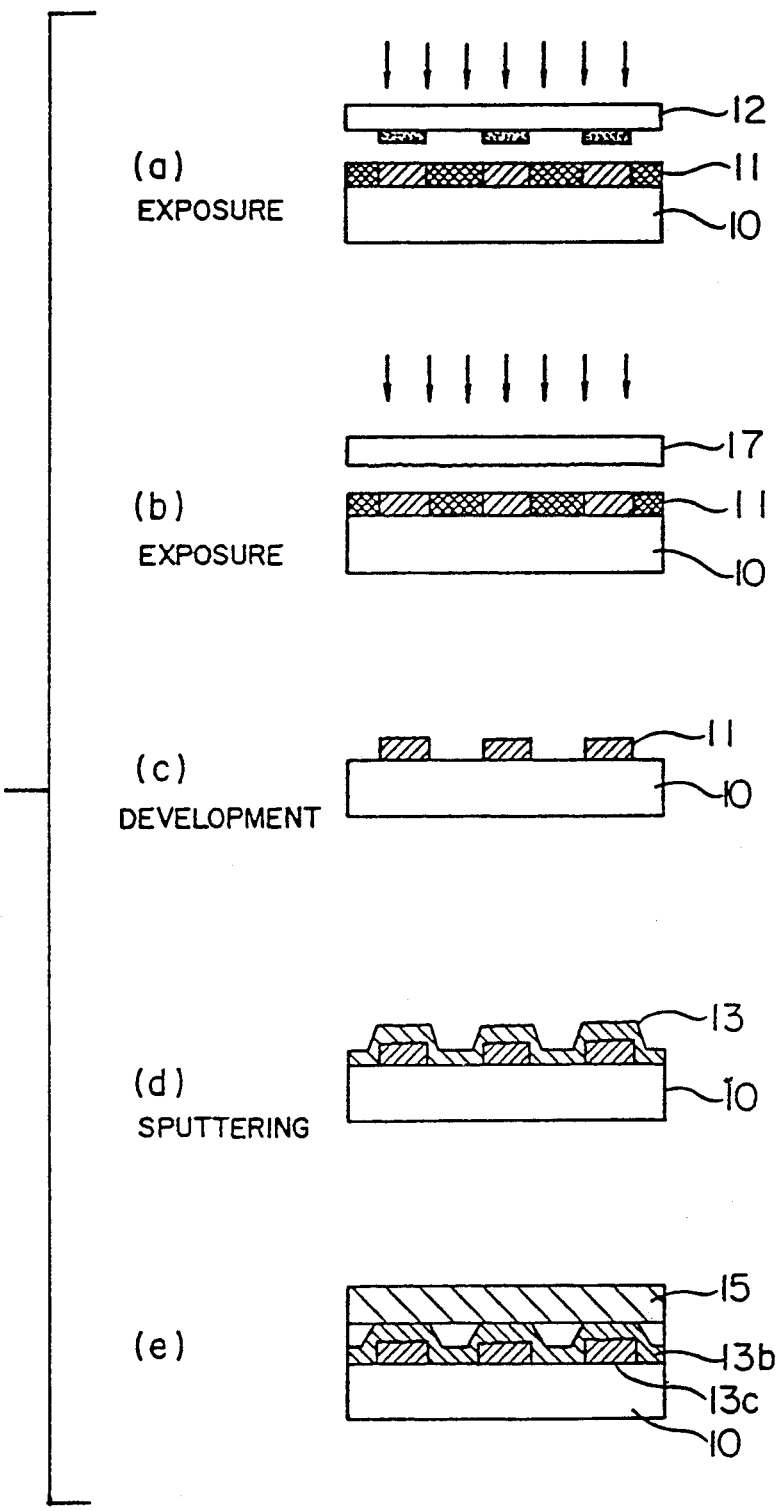
FIG. 4 is a diagram for illustration of one example of the production method of the optical recording member of the present invention.

FIG. 4 is a series of sectional views indicating the steps of a specific example of the above production method, and to describe in detail with respect to this drawing, first, on a light-transmissive base material 10, a photoresist layer 11 is applied uniformly with a thickness of 4,000 to 20,000 Å by means of a rotary system photoresist coating machine. Next, by the use of a mask registration device, after a photomask 12 formed corresponding to the information recording pattern is superposed on the photoresist layer 11, the first exposure (patterning exposure) is effected.

Next, as shown in FIG. 4(b), by the use of a glass plate 17 with its one surface roughened to a fine unevenness texture, exposure is again effected (surface roughening exposure). In this case, it is preferable to approximate the roughened surface of the glass substrate 17 to the surface of the resist layer as nearly as possible to improve light scattering property of the roughened surface portion obtained. Also, the glass with roughened surface is used as the mask for the second exposure in this example, is not limitative of the present invention, but may be a sufficiently transparent material having a fine light and dark pattern in which fine unevenness may be formed (namely, surface roughening) after development on the resist layer surface by exposure.

Next, as shown in FIG. 4(c), when the photoresist layer 11 is developed, when a resist of the posi-type is used, the photoresist irradiated with UV-ray flows away, while the unirradiated resist remains, whereby the pattern of the photomask 12 is transferred onto the base material 10. In this manner, the photoresist layer 11 with the surface roughened is formed in the shape of the information recording bit 4 shown in FIG. 1 or the guide track 9 shown in FIG. 2, for example, with a width of about $5\mu$ or a pitch of about $15\mu$.

Next, as shown in FIG. 4(d), a thin film layer of light reflective material or optical recording material 13 is formed by sputtering or chemical method.

Next, as shown in FIG. 4(e), a substrate 15 such as polyvinyl chloride, etc. is caused to adhere to obtain an optical recording medium having a high reflectance portion 13b and a low reflectance portion 13c. Between the above exposure steps (a) and (b), a developing step may be provided for surface roughening of said photoresist before exposure or alternatively the order of the exposure steps (a) and (b) may be reversed. In the above example, the base material 10 is constituted of a light-transmissive material, but the substrate 15 can be made light-transmissive so as to read by irradiation of light from the substrate 15 side, and in this case, the base material 10 need not be a light-transmissive material.

In this optical recording member, when light is permitted to enter from the light-transmissive substrate 10, for example, at the high reflectance portion 13b, the light is strongly reflected, while at the low reflectance portion 13c, reflectance will be lowered due to the presence of the photoresist with the roughened surface. In the case of preparing a card of ROM type, by employment of the light reflective material as described above as the layer 13, the information recording bit 4 shown in FIG. 1 is formed at the low reflectance portion 13c, while in the case of preparing a card of the DRAW type, by employment of the above optical recording material, the optical track 8 shown in FIG. 2 can be formed at the high reflectance portion 13b, and the guide track 9 at the low reflectance portion 13c.

As the photoresist 11 to be used in the above method, materials such as orthoquinone diazido/novolak type, azido/rubber type, p-diazodiphenylamine paraformaldehyde condensate type, azide/polymer type, polyvinyl cinnamate type, and polycinnamilidene vinyl acetate may be employed.

In the optical recording member of the ROM type produced as described above, the information recording bit of low light reflectance is read by a line sensor (e.g. CCD line sensor) or a laser beam. In the optical recording member of the ROM type, a guide track is not necessarily required, but the information recording bit array can be used as the guide track.

Also, in the optical recording member of the DRAW type produced as described above, as the result of measurement of light reflectances of the optical recording track 13b and the guide track 13c by the use of a white light lamp of 400 to 700 nm, for example, the optical recording track 13b has a light reflectance of about 50%, and the guide track 13c a light reflectance of about 10%. When a bit information is written in the optical recording member either, 2 or 3 beams are used. In the example of using 3 beams, as shown in FIG. 12, by detecting the difference in reflectance between the guide track 13c and the optical recording track 13b with the beams A, C on the both sides, a bit information is written in the optical recording track 13b with the central beam B so that no deviation to right and left occurs with confirmation of the positions of the guide tracks 13c, 13c, whereby the control system becomes simpler as compared with that in the case of one beam. The guide track 13c need not be formed alternately with the optical recording track 13c, and a number of the guide tracks may be omitted. In this case, the bit information is written by determining the position of the optical recording track 13b by calculating the distance of the guide track 13c.

Production method (II)

In the production method according to the second embodiment of the present invention, in producing an optical recording member having formed thereon an information recording pattern constituted of the high reflectance portion and the low reflectance portion, the above low reflectance portion is formed by the surface roughening treatment corresponding to the information recording pattern, and the formation process of the low reflectance portion subjected to surface roughening corresponding to the information recording pattern comprising the following steps:

(a) the step of forming a photoresist layer on a substrate having fine unevenness formed on the surface;

(b) the step of effecting patterning exposure on the above photoresist layer through a mask corresponding to an information recording pattern; and (c) the step of performing development on the photoresist layer subjected to the above patterning exposure to subject the surface of the substrate having fine unevenness exposed correspondingly to the information recording pattern, thereby obtaining an information recording pattern with a roughened surface.

Further, in the method of the present invention, a step of laminating a light reflective material layer or an optical recording material layer as described above on the entire surface or a part of the base material so as to cover the low reflectance portion obtained in the above step may be included.

Figure 5:
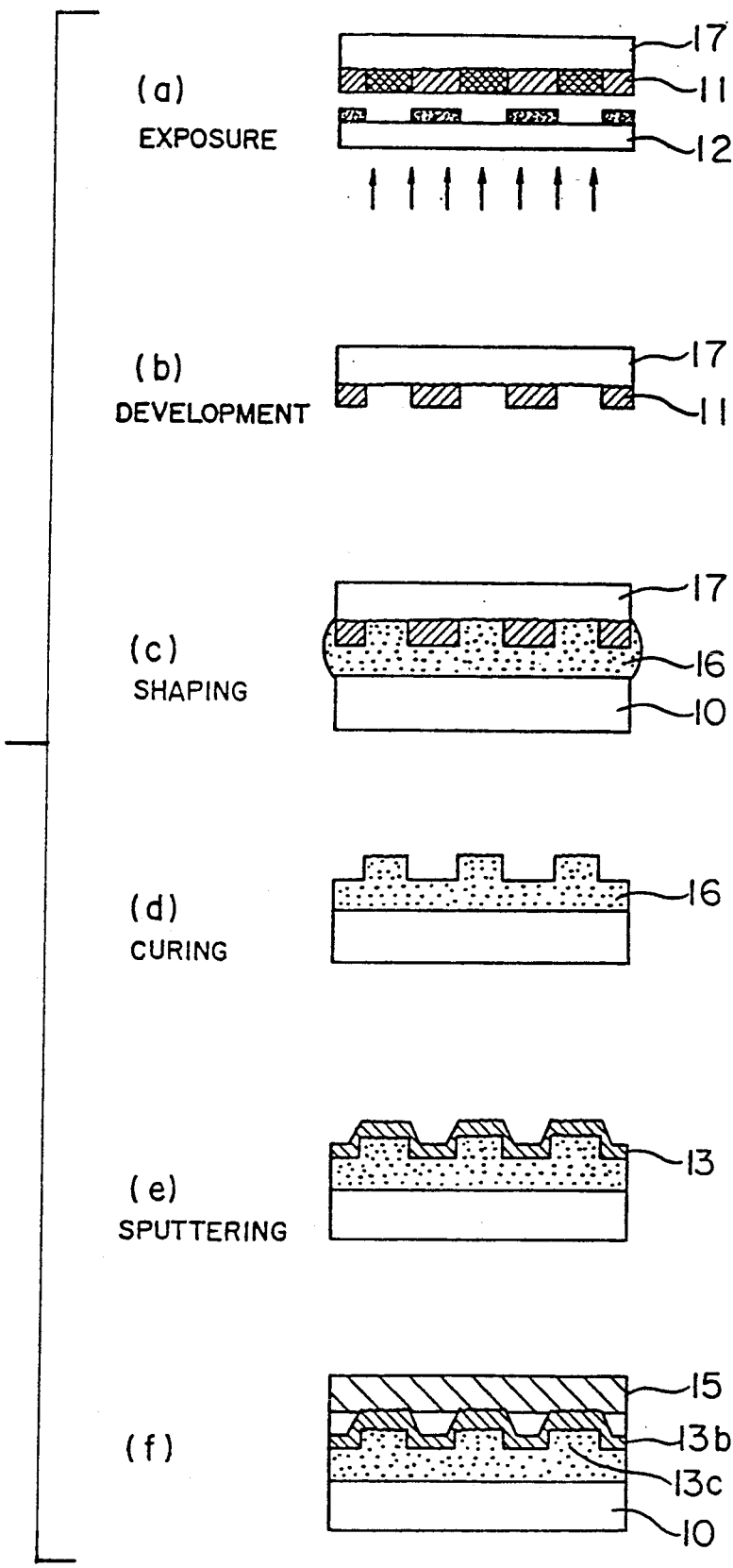
FIGS. 5, 6, 7, 8, 9, 10 and 11 are drawings for illustration of other examples of the production method of the optical recording member of the present invention.

FIG. 5 comprises sectional views of the steps showing a specific example of the above preparation method, and to describe in detail according to this figure, as shown in FIG. 5(a), after a photoresist layer 11 is applied uniformly to a thickness of 4000 to 20,000 Å on a glass plate 17 subjected to fine surface roughening by means of a rotary system photoresist coating machine, a photomask 12 is superposed on the photoresist layer by the use of a mask registration device, followed by exposure. Next, as shown in FIG. 5(b), when the photoresist layer 11 is developed, in the resist of the posi-type, the photoresist irradiated with UV-ray flows away, and the resist not irradiated remains, whereby the pattern of the photomask 12 is transferred onto the glass plate 17. By this procedure, on the photoresist layer 11, an opening with a thickness of about 5μ and a pitch of about 15μ is formed to cause the rough surface of the glass plate 17 to be exposed in a pattern to produce the optical recording member of the present invention.

Further, in the present invention, with the use of the above optical recording member as the original plate, additional optical recording members can be further produced as copies.

That is, as shown in FIG. 5(c), after performing pressing by means of a pressing machine with the original plate produced in FIG. 5(b) laminated through a templating agent 16 comprising a molded resin of, for example, ionizable radiation curable resin or a thermosetting resin on a light-transmissive substrate 10, as shown in FIG. 5(d) by peeling off and curing the original plate and the templating agent 16, or curing by means of a certain curing means under the state of FIG. 5(c) before peeling, a protruded portion with roughened surface such as an information recording bit with a width of about 5μ and a length of about 20μ is formed on the templating agent 16.

Subsequently, as shown in FIG. 5(e), a thin film layer of a light reflective material or an optical recording material 13 with a film thickness of 500 to 1,000 Å is formed by vapor deposition, sputtering or chemical method, etc. Next, as shown in FIG. 5(f), a substrate 15 of polyvinyl chloride, etc. is bonded by the use of an adhesive, etc. to prepare an optical recording member having the high reflectance portion 13b and the low reflectance portion 13c.

Similarly in the specific example shown in FIG. 4, when a card of the ROM type is produced, by employment of a light reflective material as the layer 13, the information recording bit 4 shown in FIG. 1 is formed in the low reflectance portion 13c, while in the case of producing a card of the DRAW type, by employment of an optical recording material as the layer 13, the optical recording track 8 shown in FIG. 2 is formed in the high reflectance portion 13b, and the guide track 9 in the low reflectance portion 13c.

In the specific example, although a resin portion 16 exists as shown in the light reflectance portion 13b, this is not necessarily required, and it is only sufficient that a resin with roughened surface exist in the low reflectance portion 13c.

As the resin for templating to be used in the above method, the following resins can be used.

(A) Ionizable radiation photoresin (1) Electron beam curable resin: Polymerizable oligomers or monomers having acryloyl group such as urethane acrylate, oligoester acrylate, trimethylolpropane triacrylate, neopentyl glycol diacrylate, epoxy acrylate, polyester acrylate, polyether acrylate, and melamine acrylate, or formulations comprising these oligomers or monomers with monofunctional or polyfunctional monomers containing polymerizable vinyl group such as acrylic acid, acrylamide, acrylonitrile, and styrene.

(2) UV-ray curable resin: The resin compositions of the above (1) to which photopolymerization initiator, sensitizer or desired additive are added.

(B) Thermosetting resins

Epoxy resin, melamine resin, unsaturated polyester resin, urethane resin, urea resin, amide resin, phenol/-formalin resin.

Production method (III)

In the Production method according to the third embodiment, formation of information recording pattern is performed according to the following steps:

(a) the step of forming a photoresist layer on a base material with smooth surface or fine unevenness formed thereon;

(b) the step of effecting patterning exposure through a mask corresponding to an information pattern on the above photoresist layer; and (c) subsequently performing developing and etching to effect selective surface roughening or surface flattening at the portion of the base material where no resist layer exists to obtain an optical recording member having an information recording pattern formed thereon.

Figure 6:
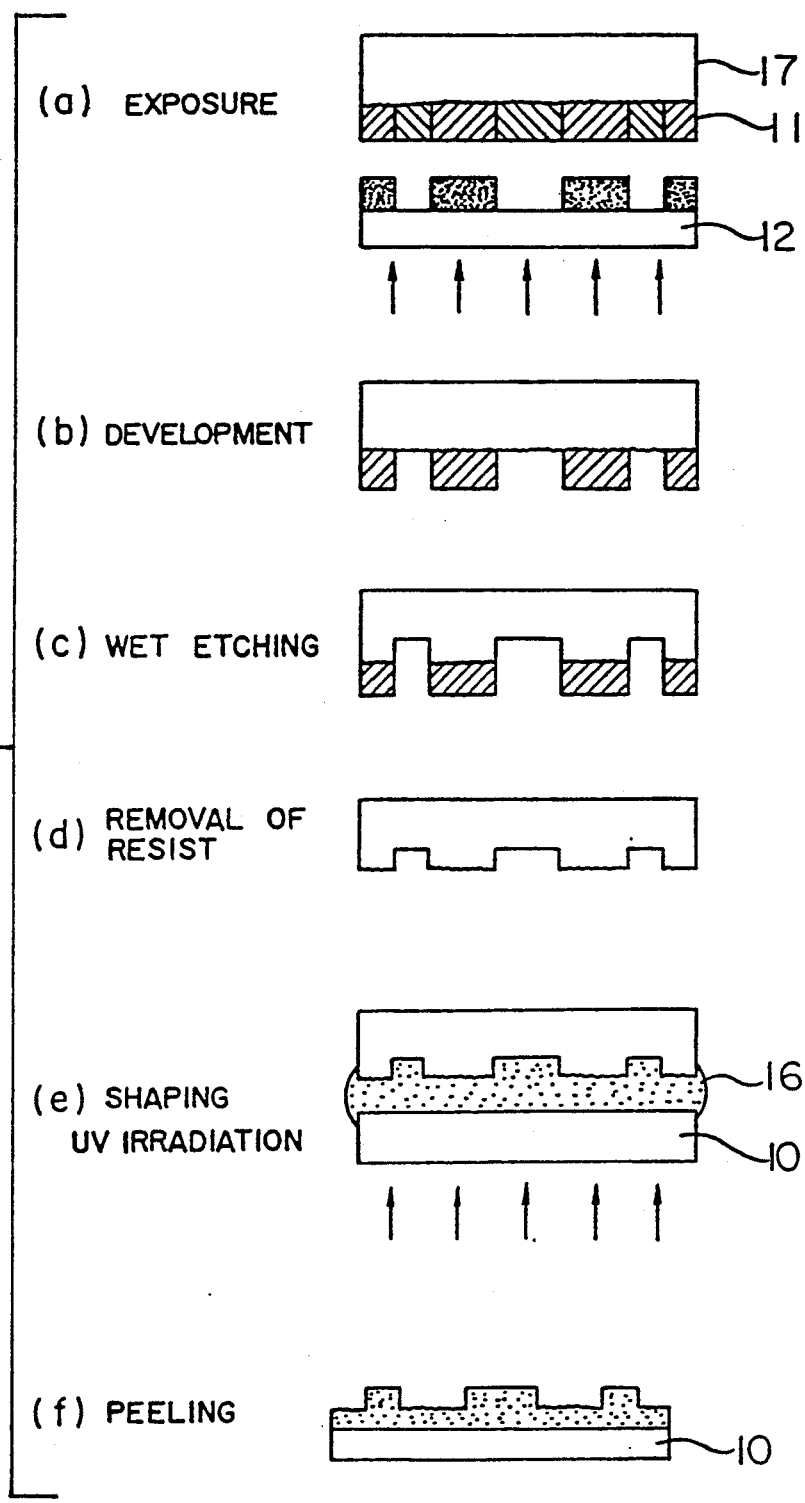
Figure 7:
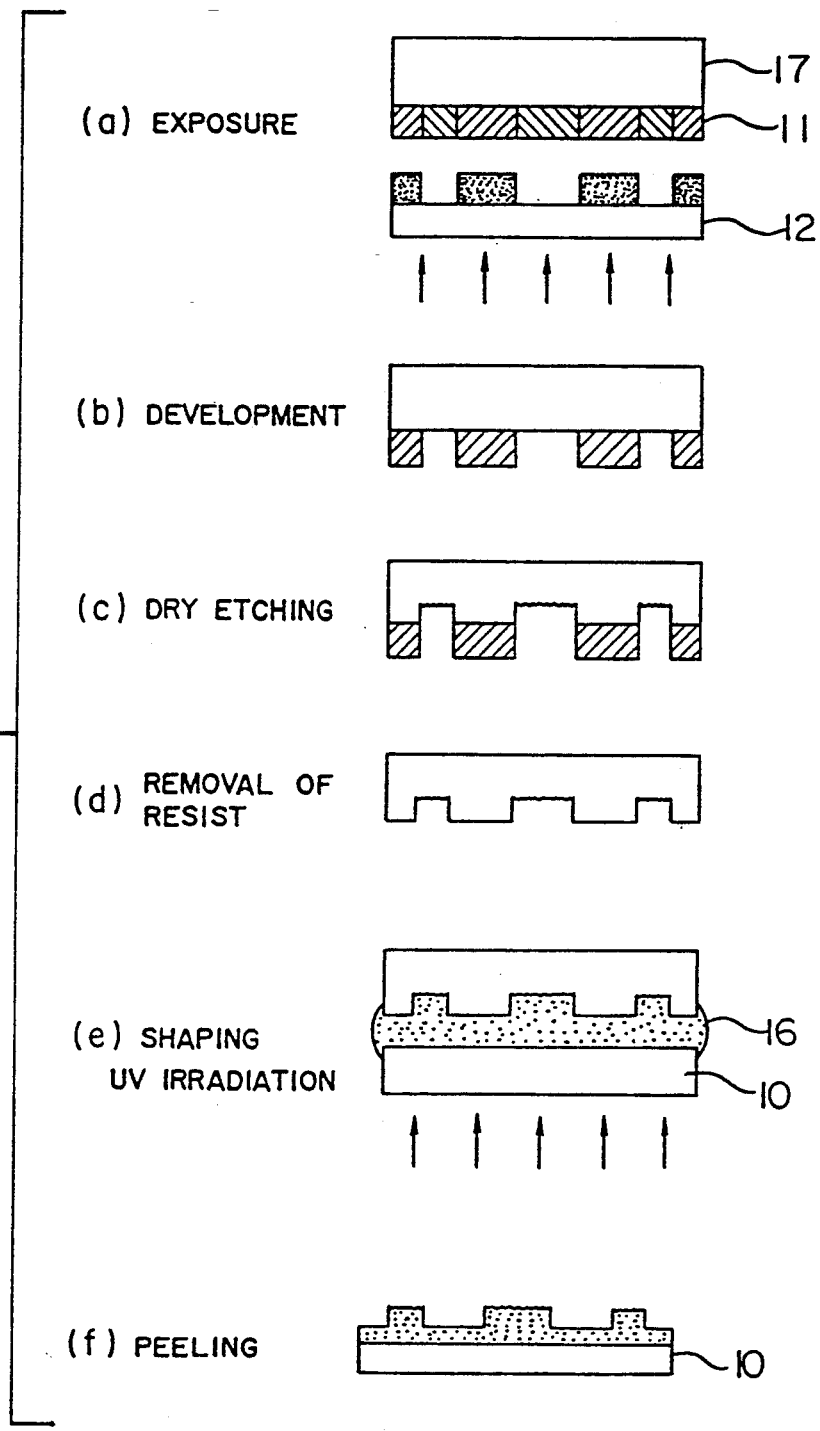

FIGS. 6 and 7 show other examples of the templating type similarly as the specific example in the above FIG. 5. These specific examples have the merit of improvement of durability of the press mold.

In FIG. 6, after the photoresist layer 11 is applied as a coating on the glass substrate 17 subjected to fine surface roughening, the photomask 12 is superposed on the photoresist layer 11 before exposure (FIG. 6(a)), and then the photoresist layer 11 is developed (FIG. 6(b)), which step is followed by wet etching with an etchant for glass such as an aqueous solution of ammonium fluoride/nitric acid for 1 minute to 1 hour (FIG. 6(c)) to smoothen the rough surface at the opening of the glass substrate 17 where no photoresist exists. in this case, the etchant for a glass may be any other material which can smoothen the etching surface, and the etching depth is not particularly defined, but etching may be effected until the surface becomes flattened. Under this state, the product can be used as the optical recording member.

Further, in the present invention, as shown in FIG. 6(d), after removal of the resist, as shown in FIG. 6(e), after performing pressing by means of a pressing machine with the original plate prepared in FIG. 6(d) through a templating agent 16 comprising an ionizable radiation curable resin or a thermosetting resin as described below on the light-transmissive substrate 10, an electron beam, UV-rays are projected thereon or heating is effected to cure the resin, followed by peel-off of the original plate and the templating agent 16 as shown in FIG. 6(f) to form, for example, an information recording bit with roughened surface on a part of the templating agent 16, following thereafter the steps similarly as in FIGS. 5(e) and 5(f) to produce an optical recording member.

Examples of the above templating agent 16 are shown below.

(A) Ionizable radiation photoresin (1) Electron beam curable resin: Polymerizable oligomers or monomers having acryloyl group such as urethane acrylate, oligoester acrylate, trimethylolpropane triacrylate, neopentyl glycol diacrylate, epoxy acrylate, polyester acrylate, polyether acrylate, and melamine acrylate, or formulations comprising these oligomers or monomers with monofunctional or polyfunctional monomers containing polymerizable vinyl group such as acrylic acid, acrylamide, acrylonitrile, and styrene.

(2) UV-ray curable resin: The resin composition of the above (1) to which photopolymerization initiator is added.

(B) Thermosetting resin

Epoxy resin, melamine resin, unsaturated polyester resin, urethane resin, urea resin, amide resin, phenol/formalin resin.

The specific example shown in FIG. 7 differs from that in the above FIG. 6 on the point that a rough surface is formed on the glass plate 17 by etching in FIG. 7(c) to form an information recording bit or a guide track portion. For etching in this case, both dry etching and wet etching can be used. As the dry etching method, etching can be performed so that the etching surface of glass will be roughened by the use of $CF_4$ plasma, HF gas, etc. Further, for wet etching, other than the etchant used in the example of the above FIG. 6, a highly concentrated hydrofluoric acid solution, for example, acidic ammonium fluoride/mineral acid type solution can be used.

Figure 8:
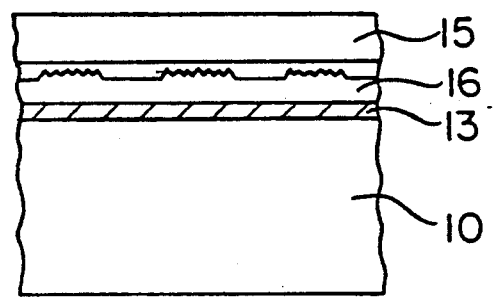

The specific example in FIG. 8 is an example in which a light reflective material or an optical recording material 13 is formed by sputtering, plating method on the base material 10, and a templating agent 16 having formed thereon a rough surface and the substrate 15 are laminated thereon, as contrasted to the specific examples in FIGS. 5, 6 and 7, in which the light reflective material or optical recording material 13 is formed on the templating agent 16.

In the specific examples in FIGS. 5, 6 and 7, FIGS. 9 and 10, reading and writing are possible from either side of the base material 10 and the substrate 15, but in this specific example, reading and writing are performed only from the side of the substrate 15.

Production method (IV)

Figure 9:
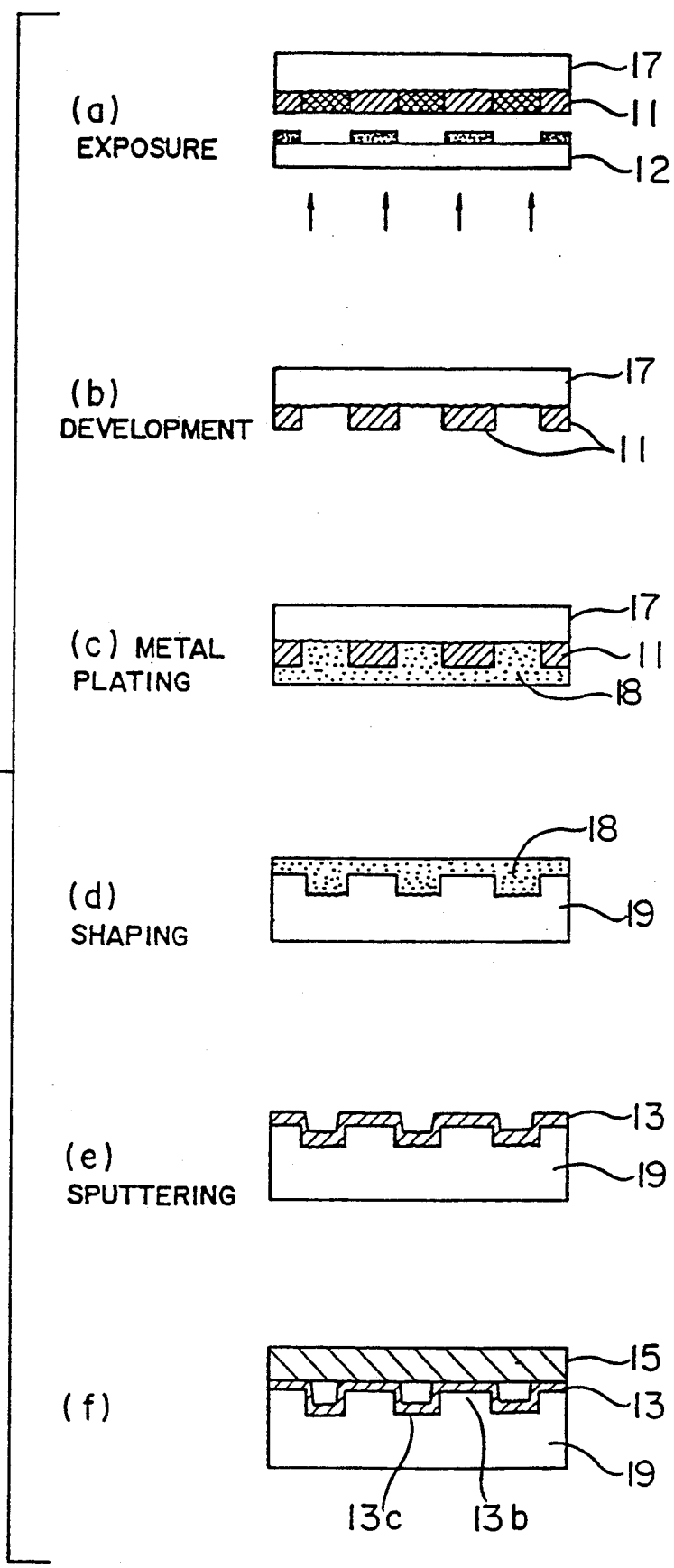

Next, the specific example shown in FIG. 9 will be described. In this specific example, before the templating step in FIG. 5(c), as shown in FIG. 9(c), the plating step is provided to form a metal plated layer 18 so as to cover the photoresist layer 11, and then said metal plated layer 18 is peeled off to form an information recording bit or a pattern of guide track with roughened surface on the metal plated layer 18. Subsequently, by using this as the original plate, after performing pressing on the molded resin 19 as shown in FIG. 9(d), as shown in FIG. 9(e), by peeling off and curing the original plate and the molded resin 19, an information recording pattern with roughened surface is formed on the molded resin 19, which step is then followed by formation of a thin film layer of a light reflective material or an optical recording material 13.

Figure 10:
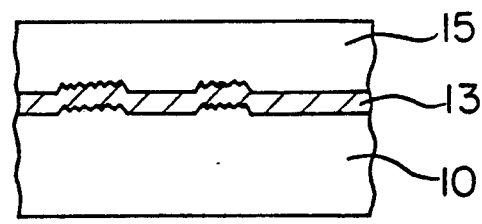

In the above specific example, a metal plating 18 is used as the original plate for the press, but a metal plate subjected to precise etching may also be used as the press mold. Also, by applying the above metal plate to the mold, a molded resin having an information recording pattern with roughened surface can be also obtained by injection molding. Further, as shown in FIG. 10, a light reflective material or an optical recording material 13 may also be formed by vapor deposition, sputtering, plating and embossed with a pattern by the use of the above metal plate as the press mold, which step is then followed by lamination of the substrate 15.

Production method (V)

Next, the specific example shown in FIG. 11 will be described.

Figure 11A:
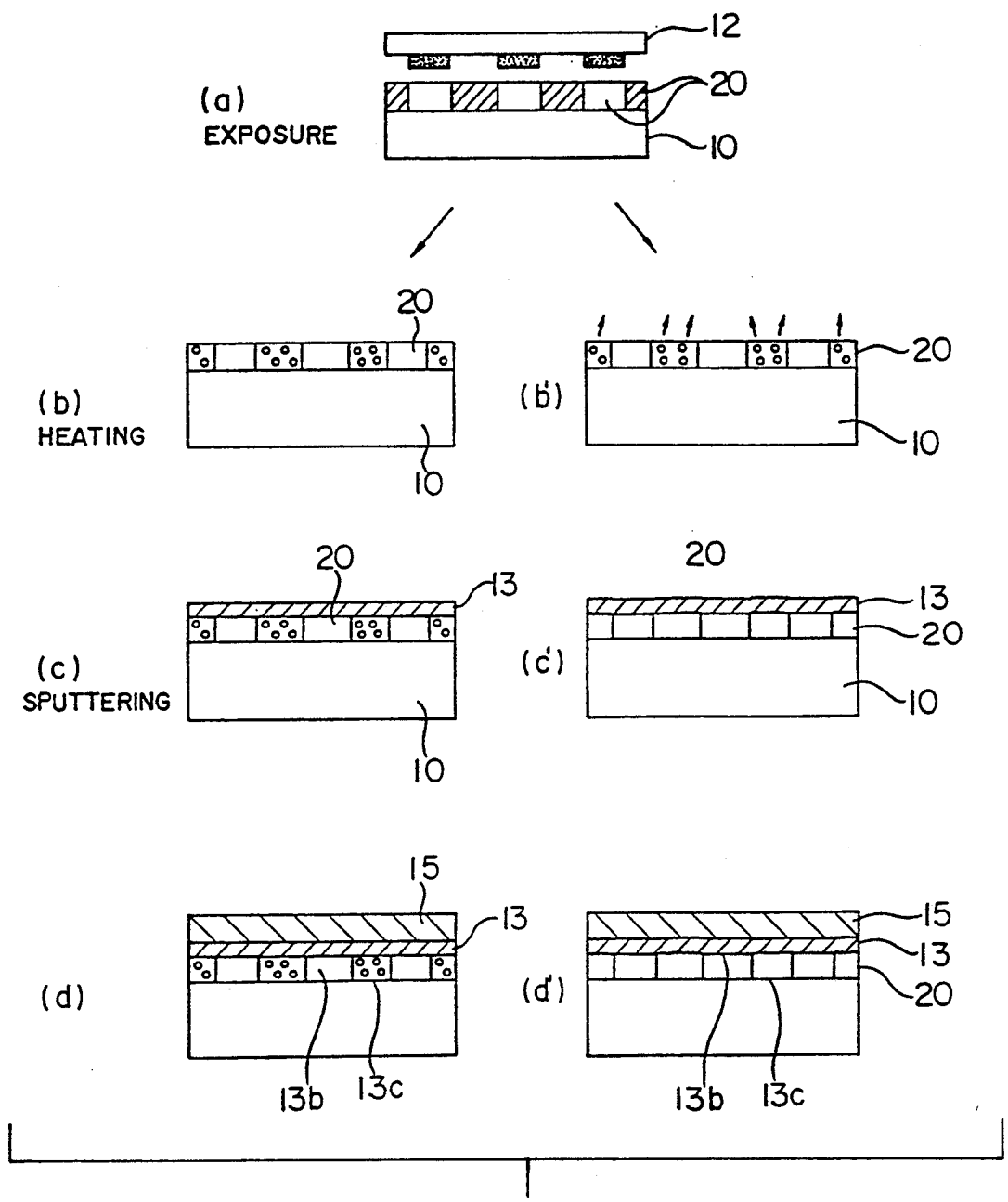
Figure 11B:
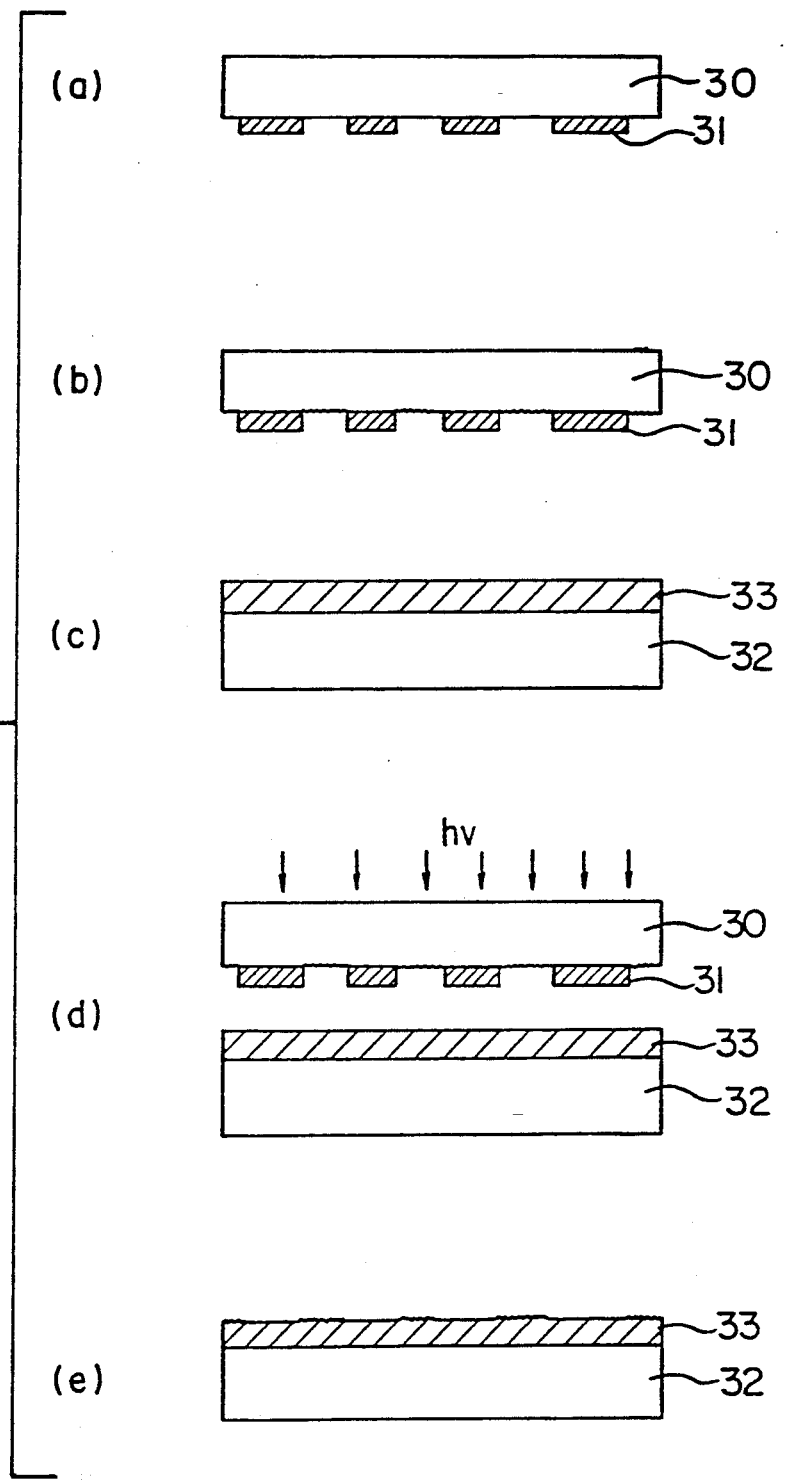

First, after a coating of the material 20 on the light-transmissive base material 10, the photomask 12 is superposed on the material layer 20, after which irradiation with UV-rays (FIG. 11(a)) is carried out. The material 20 is a material which undergoes change during transmittance of light between the exposed portion and the unexposed portion when heating treatment is applied after irradiation with UV-rays. This may be considered to be due to lowering in reflectance by scattering of light which is caused as follows. That is, by exposure and heating treatment, as shown in FIG. 11(b), light is scattered by formation of bubbles of nitrogen gas, etc. at the portion irradiated with UV-rays, or as shown in FIG. 11(b'), the bubbles of nitrogen gas generated are expanded or burst to be dissipated outside, whereby bubbles are formed internally of the material layer 20, or the surface is changed to fine unevenness texture. In this specific example which can produce an optical recording member by performing sputtering of a light reflective material or optical recording material 13 similarly as in the specific example in FIG. 4, it has also the merit that the production process can be further simplified.

In this specific example, as the above material 20, for example, Carber film (trade name) of Carber Co. can be used, and its composition comprises Saran (copolymer of vinylidene chloride and acrylonitrile), PMMA, P-diazo-N,N-dimethylaniline BF$_4$-salt. Otherwise, for example, those having a light-sensitive material such as diszonium compound, azide compound, bisazide compound, etc. dispersed in a thermoplastic resin such as styrene type, rosin type, polyester type resins, etc. may be also used.

Production method (VI)

In the present invention, the process of forming the low reflectance portion subjected to surface roughening corresponding to an information pattern can be practiced according to the following steps as shown in FIG. 11B:

(a) the step of forming a mask pattern 31 corresponding to an information recording pattern on a light-transmissive base material 30 (FIG. 11B(a));

(b) the step of surface roughening by etching the surface of the portion of the above light-transmissive base material 30 where no mask pattern 31 is formed (FIG. 11B(b));

(c) the step of forming a photoresist layer 33 on the base material 32 (FIG. 11B(c));

(d) the step of effecting surface roughening exposure on the photoresist layer 33 of the base material 32 obtained in the above (c) with the use of a mask for surface roughening exposure obtained in the above step (b) through said mask for surface roughening exposure (FIG. 11B(d)); and (e) the step of performing development on the photoresist layer subjected to the above surface roughening exposure, thereby obtaining an information recording pattern comprising the low reflectance portion with roughened surface (FIG. 11B(e)).

Also, in the above embodiment, by removing the mask pattern formed on the surface of the transparent material obtained in the above step (b), this can be also used as such as the optical recording member (or its original plate).

For the above light-transmissive material, light-transmissive materials such as glass can be used, and also for the mask pattern material, a metal such as Cr can be used, but other materials can also be suitably used.

The etchant to be used in the etching step in the above step (b) can contain fine particles. More specifically, when the transparent material is a glass, a mask pattern is Cr, non-glass etching agents, or those comprising mixtures of acidic ammonium fluoride and concentrated sulfuric acid formulated with inorganic fine particles such as alumina (particle size: about 1µ), glass particles, SiC particles, and cerium oxide can be used. The kind and the particle size of the inorganic fine particles in this case can be selected depending on the purpose. By selecting these conditions, the rough surface condition obtained can be controlled.

An example of the above etching agent and treatment conditions is set forth below.

First, a glass etchant (a mixture of 50 g of Lelight SX-20 (France: produced by SEPPIC Co.) with 20 g of 95% H$_2$SO$_4$) is applied as a coating on the Cr mask pattern, spread uniformly by a roller through a protective film (e.g. PET film), left to stand for some ten seconds to about 2 minutes, and, after removal of the protective film, washed with water and dried, whereby an optical recording member (original plate) having an information pattern comprising the low reflectance portion with roughened surface formed thereon can be obtained.

Production method (VII)

Figure 11C:
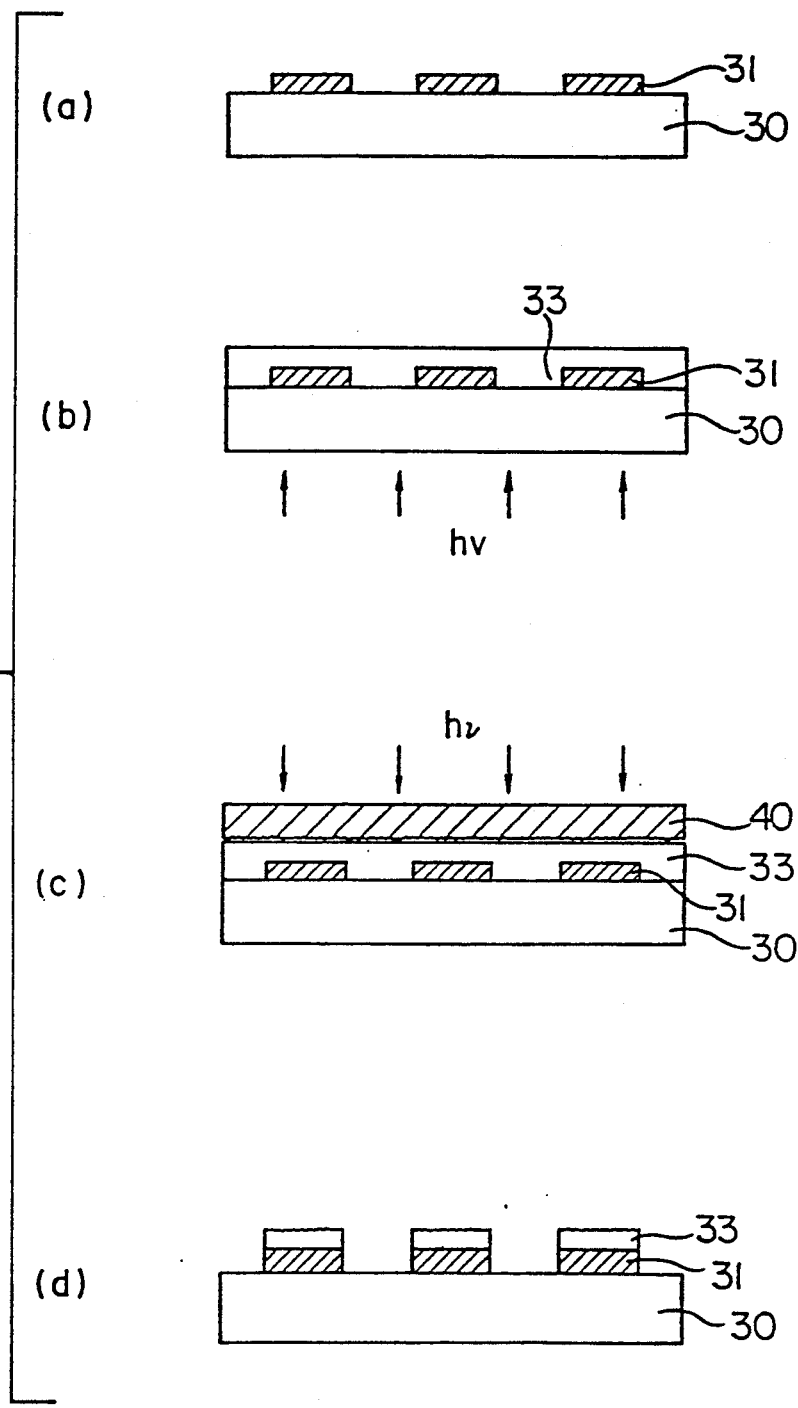
Figure 12:
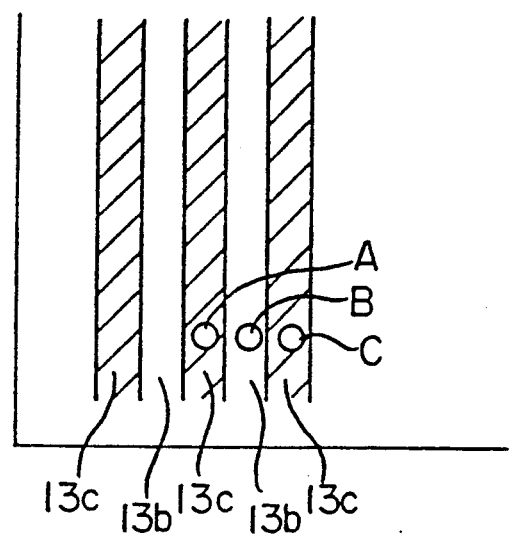
FIG. 12 is a diagram for illustration of the writing system of the optical recording member of the present invention.

In the present invention, the step of forming the low reflectance portion subjected to surface roughening corresponding to an information pattern can be practiced according to the following steps as shown in FIG. 11C:

(a) the step of forming a mask pattern 31 corresponding to an information recording pattern on a light-transmissive base material 30 (FIG. 11C(a));

(b) the step of forming a photoresist layer on the surface of the above light-transmissive base material 30 so as to cover the above mask pattern 31 (FIG. 11C(b));

(c) the step of effecting the first exposure on the surface of the above light-transmissive base material 30 on the side opposite to the photoresist layer 33 (patterning exposure) (the same Figure (b));

(d) the step of subsequently performing the second exposure on the photoresist layer 33 subjected to the above first exposure through a transparent material 40 having a fine light and dark pattern formed thereon from the side of said photoresist layer 33 (surface roughening exposure) (the same Figure (c)); and (e) the step of performing development on the photoresist layer 33 subjected to the above second exposure, thereby obtaining an information recording pattern comprising the low reflectance portion with roughened surface (the same Figure (d)).

To describe further the above method by referring to a specific example, for example, on the surface of a light-transmissive substrate such as glass, a mask pattern made of a desired metal such as Cr comprising a pattern of Cr thin film is formed according to a conventional method. Further, the Cr mask pattern is coated with a posi-type photoresist by a spinner, after which prebaking is carried out at 90° to 100° C. for about 30 minutes.

Next, on the photoresist layer thus formed, exposure is effected by a ultra-high-voltage mercury lamp (4 KW) at a distance of 80 cm/cm from the light-transmissive substrate side of the back surface (patterning exposure). Subsequently, with a ground glass plate (#4000) closely contacting the surface of the photoresist layer side, the second exposure (surface roughening exposure) is effected. Exposure in this case is effected for about 1 sec. by the above ultra-high voltage mercury lamp. Further, by use of a certain developer (e.g. alkali developer), developing processing is applied for about 30 minutes, whereby an information pattern with a structure laminated with a resist layer having a roughened surface on the Cr mask pattern can be obtained.

The above method is excellent on the point that contact irregularity during patterning can be eliminated. That is, according to the above method, surface roughening exposure can enhance precision of the resist layer pattern simultaneously with finishing of the surface of the resist layer to obtain a good roughened state.

Production method (VIII)

Figure 11D:
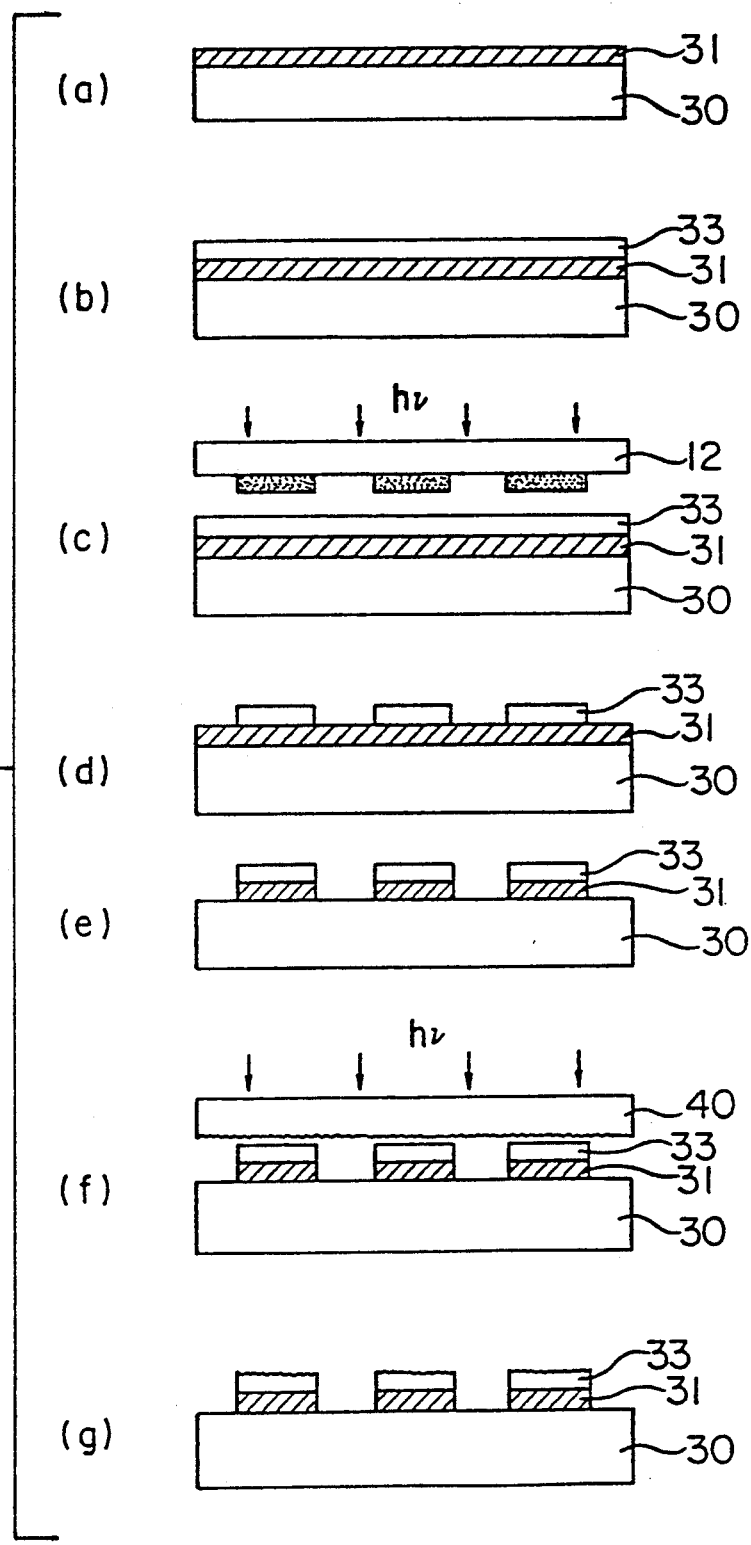

In the present invention, the step of forming the low reflectance portion subjected to surface roughening corresponding to information pattern can be practiced according to the following steps as shown in FIG. 11D:

(a) the step of forming a metal mask layer 31 on a light-transmissive base material 30 (FIG. 11D(a));

(b) the step of forming a photoresist layer 33 on the surface of the above metal mask layer 31 (the same Figure (b));

(c) the step of effecting the first exposure through a photomask 12 on the side of the above photoresist layer 33 (patterning exposure) (the same Figure (c));

(d) the step of subsequently forming a photoresist layer 33 corresponding to an information recording pattern by performing development on the photoresist layer 33 subjected to the above first exposure (the same Figure (d));

(e) the step of further forming a laminated product of the photoresist layer and the metal mask layer 31 corresponding to the information recording pattern by etching the metal mask layer 31 (the same Figure (e));

(f) the step of effecting the second exposure on the photoresist layer 33 through a transparent material 40 having fine light and card pattern formed thereon (surface roughening exposure) (the same Figure (f)); and (g) the step of further performing development on the photoresist layer 33 subjected to the above second exposure, thereby obtaining the information recording pattern comprising the low reflectance portion with roughened surface (the same Figure (g)).

As the materials for the above light-transmissive substrate, the mask layer, etc., the same materials as for the above production methods (VI), (VII) can be used.

Production method (IX)

The optical recording member according to the present invention is itself excellent in simplification of the production steps, but in the present invention, by employment of the method as described below, the method can become further suitable for bulk production and bulk copying on an industrial scale.

For example, in the production method in this embodiment, by the use of the optical recording member comprising the information recording pattern comprising the low reflectance portion with roughened surface formed thereon obtained in the above production methods (I) to (VIII) as the original plate for surface roughening, further optical recording members can be made as copies from the original plate for surface roughening according to such a method as templating press, etc.

Further, in the present invention, an optical member can be obtained by preparing a mother mask from the above original plate for surface roughening and by templating by the use of the mother mask as the original plate for bulk copying.

The method of producing an optical recording member through such a mother mask is particularly effective when the original plate for surface roughening is formed of a mechanically or chemically weak material.

The optical recording member obtained by templating by the use of the mother mask as the original plate for copying as described above can also have a light reflective material layer or optical recording material layer on the entire surface or a part of the base material so as to cover the low reflectance portion of the optical recording member.

Also, with regard to bulk copying, as shown in Production Example (VI) as described below and in FIG. 17, by placing the mask in a cylindrical roll, for example, an optical card of the ROM type can be continuously produced in a large quantity according to the wind-up system.

Production method (X)

In the present invention, with the use of the respective optical recording members obtained in the above production methods (I) through (IX) as original plates, stampers can be prepared from the original plate according to the plating, pressing method, etc., and optical recording members can be further made as copies according to the injection method, the hot pressure pressing method or the resin templating method as described above by use of the stampers.

Examples of the material of the stamper to be used in this case are Ni, Al, Cu and Cr. On the other hand, although the resin for copying is not particularly limited, thermoplastic resin is preferably used particularly in the hot pressure pressing method.

In the following, the present invention is described in more detail with respect to practical production examples, but the present invention is not limited in any manner by the descriptions in these examples.

PRODUCTION EXAMPLE 1

According to the method shown above in FIG. 4, an optical recording member was produced according to the steps shown below.

(1) By the use of a PMMA base material with a thickness of 0.4 mm and a size of 100×100 mm.

(2) A photoresist was applied as a coating on the base material surface under the following conditions.
Spinner coating: 3,000 rpm, 20 sec.
Resist: Sipley Microposit 1400
Thickness: 5,000 Å

(3) After coating, prebaking was conducted at 90° C. for 20 minutes.

(4) Next, pattern exposure was effected under the following conditions.
Mask: Cr sputter mask
Pattern: DRAW type
  Guide track width: 5 μm
  Information track width: 10 μm
  ROM type
  Information recording bit width: 5 μm
    length: 5–20 μm
Ultra-high-voltage mercury lamp: 4 KW, 8 sec.

(5) Next, ground glass exposure (whole surface contact exposure) was conducted under the following conditions.
Ground glass: average roughness: 0.3 μm
Ultra-high-voltage mercury lamp: 4 KW, 6 sec.

(6) Development after exposure was performed under the following conditions.
Dipped in Sipley Microposit developer for 60 sec, and washed with water.

(7) Postbaking was effected at 90° C. for 20 minutes, whereby a resist layer having a rough surface was formed on the substrate.

(8) Next, a recording layer (a light reflective material layer or an optical recording material layer) was formed under the following conditions.
By the use of a direct current bipolar sputtering device, a layer with a thickness of 500 Å was formed.
DRAW type: Te sputtering
ROM type: Al sputtering (9) For adhesion between the substrate and the base material, a substrate of polyvinyl chloride with a thickness of 0.3 mm was laminated on the base material obtained as described above by the use of Highsole produced by Toray as the adhesive to be integrated therewith.

(10) The integrated product was punched into the size of a card to obtain an optical card which is an example of the optical recording member of the present invention.

In the above production example, for a card for use in both DRAW and ROM, the steps of DRAW and ROM are suitably combined in the above steps (4) and (8).

PRODUCTION EXAMPLE 2

The steps (1) to (7) as described in the above Production Example 1 were similarly practiced, and further, (8) a UV resin comprising a composition of 15 parts of an oligoester acrylate (produced by Toa Gosei, Aronix M-8030), 5 parts of neopentyl glycol diacrylate (produced by Nippon Kayaku, NPGD A), 3 parts of 2-hydroxyethylacrylate (Kyoeisha Yushi OH), 2 parts of trimethylolpropane triacrylate (produced by Nippon Kayaku, TMPTA) and 1.25 parts of benzophenone (produced by Junsei Kagaku) was sandwiched between a polycarbonate sheet with a thickness of 0.4 mm and the original plate, and the composite was pressed by an air press under 4 kg/cm$^2$ for 30 sec, which step was then followed by curing by UV irradiation.

The UV irradiation conditions were as follows.

High-voltage mercury lamp: cured after exposure at 80 W/cm$^2$ for 30 sec.

(9) After curing of the resin, the resin was peeled off from the original plate to obtain a cured resin having a roughened pattern portion on the surface.

(10) For the cured resin obtained, the steps (8), (9) and (10) as described in Production Example 1 were practiced to obtain an optical card which is an example of the optical recording member of the present invention.

PRODUCTION EXAMPLE 3

Figure 16:
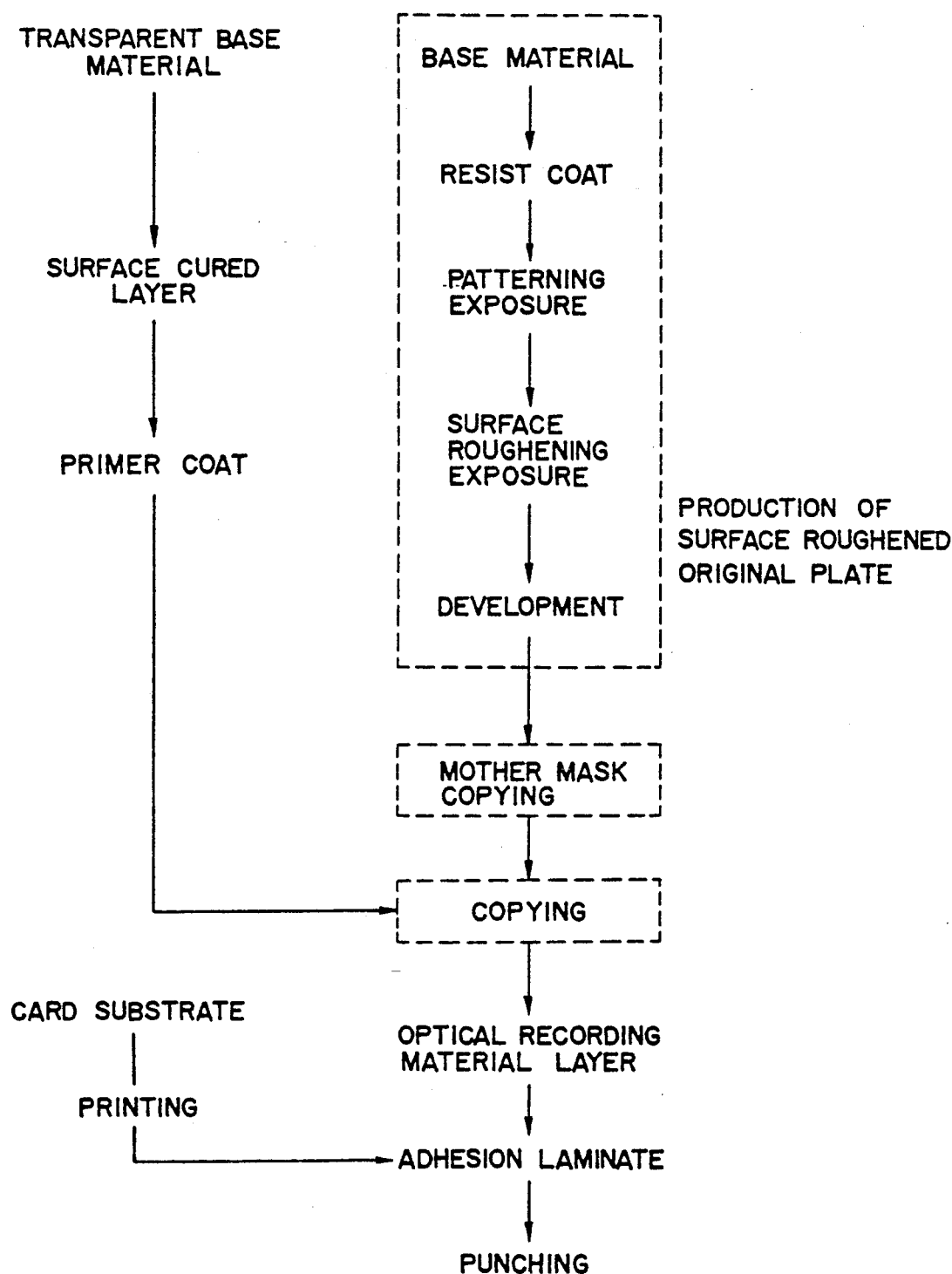
FIG. 16 is an explanatory chart showing the steps of production of the optical card.

Following the process shown in FIG. 16, an optical card as shown in FIG. 15 was prepared. The respective constituent members and the preparation conditions are as described below.

(1)

First, a surface cured layer and a primer layer were formed on both surfaces of a transparent base material.

Transparent base material

An acrylic plate with a thickness of 0.4 m (otherwise, polyethylene terephthalate, polycarbonate, epoxy, polyolefin, polyester may also be used).

Surface cured layer

Material: UV-curable hard coating agent (produced Toray, UH-001), otherwise UV-curable (oligomer, monomer initiator) resin, thermosetting resin, etc., can be used.
Coating: spinner coating, 3,000 rpm, 20 sec, thickness 1,000–2,000 Å
Cure: 80 W/cm high-voltage mercury lamp, conveyer speed 10 m/min, irradiation applied three times (distance: 150 mm)

Primer coat

Material: UV-curable primer (Threebond R-428-20), otherwise UV-curable resin, thermoplastic resin, etc. can be used.
Coating: spinner coating, 3,000 rpm, 20 sec, thickness 0.5–50μ
Cure: 80 W/cm high-voltage mercury lamp, conveyer speed 10 m/min, irradiation applied three times (distance: 150 mm)

(2) Preparation of Original Plate with Roughened Resist Surface

Base material 0.4 mm acrylic plate (thickness and material are not particularly limited if the plate has flatness)

Resist coat

Material: posi-type resist (quinonediazido type) Microposit 1400 produced by Sipley (another resist can also be used if it has good resolving characteristic, etc.)
Coating: spinner coating, 3,000 rpm, 20 sec, thickness 5,000 Å, prebaking: 90° C., 2 min.

Patterning exposure

Mask: Cr sputter mask was used
Pattern: DRAW type . . . guide track 3 μm
 information track 9μ
ROM type . . . information recording
 bit width 5μ
 length 5–20μ
Exposure ultra-high-voltage mercury lamp 4 KW, 8 sec.

Surface roughening exposure (whole surface exposure)

Ground glass: average roughness 0.3 μm (#3000 polished glass)
Exposure: ultra-high-voltage mercury lamp 4 KW, 6 sec.

Development, water washing

Developer: alkali developer (MR-D) produced by Morohoshi Ink
Developing time: 30 sec.

(3)

Mother mask copying
Base material: transparent substrate with good glatness, 12 mm acrylic plate (otherwise, the material is not particularly limited if it has the above characteristics)
Mother mask resin: UV-curable resin (produced by Morohoshi Ink, SEL-XA) (composed mainly of a polyester acrylate oligomer and neopentyl glycol diacrylate monomer, a photopolymerization initiator (Irgacure-184)) added, viscosity 100 cps (other UV-curable resin can also be used if they have low viscosities of 50 cps to about 1,000 cps, and a mold release agent, etc. is added depending on the mold release property)

Copying method

The mother mask resin is sandwiched between the above transparent base material and the original plate with roughened resist surface prepared in (2), pressed under a pressure of 5 kg/cm$^2$ for 30 sec and then irradiated by a UV 2-KW high-voltage mercury lamp at a distance of 400 mm for 1 min, which step is followed by peeling off of the original plate with roughened resist surface from the transparent substrate to copy a pattern on the transparent substrate side.

The shape of the resist layer at the roughened surface portion in the information recording pattern thus obtained is as follows.

Height of the resist layer: about 5,000 Å–μm
Diameter of the opening of the roughened surface: about 2,000–5,000 Å
Depth of the opening of the roughened surface: about 500–2,000 Å

(4) Copying

Material

As the resin for copying, a UV-curable resin (for Threebond, SS-120, urethane acrylate type) was used. Viscosity: 80–100 cps (other UV-curable resins can also be used if they have low viscosity).

Copying method

The resin for copying (SS-120) was sandwiched between the primer side of the transparent base material prepared in (1) and the UV-cured resin side of the mother mask prepared in (3), pressed under a pressure of 5 kg/cm$^2$ for 30 sec. and then irradiated with UV (2 KW high-voltage mercury lamp) at a distance of 400 mm for 1 minute, which step was followed by peeling off the mother mask from the transparent base material to copy a pattern on the transparent substrate side.

(5) Optical Recording Material Layer

A laminated film of TeO$_x$ film and TeO$_y$ film (where x=0.5, y=1.8) was formed.

The above laminated film was formed under the following conditions.

For example, a reactive sputtering device was used.
(a) TeO$_x$ film
  (1) The chamber was internally evacuated to a vacuum degree of about $1\times10^{-5}$ Torr.
  (2) Ar and O$_2$ gas were introduced into the chamber at the flow rates shown below to adjust the vacuum degree of $5\times10^{-3}$.
  Ar: 3 cc/min, O$_2$: 0.5 cc/min
  (3) Sputtering initiation
  Input power: 100 W
  Film forming time: 20 sec.
(b) TeO$_y$ film
  (1) The same as above
  (2) Ar$_2$: 2 cc/min,
  O$_2$: 1.5 cc/min
  (3) Input power: 100 W
  Film forming time: 20 sec.

(6) Adhesion Laminate

Material

Adhesive (two-liquid curing type, urethane type, UH-1260C produced by Toray)

Lamination method

A base material printed on 0.3 mm base material of polyvinyl chloride, PET, etc. was laminated with the base material provided with the recording layer prepared in the above (5) through an adhesive.

PRODUCTION EXAMPLE 4 (GLASS ETCHING TYPE)

In the above Production Example 3, preparation of the original plate with roughened surface was performed according to the following method.

(1) On a glass plate, a Cr sputter mask pattern comprising a guide track of 5 μm width and an information track of 10 μm width was formed according to photolithography.

(2) On the above mask pattern, a glass etchant with the following composition was applied as a coating and spread by roller through a protective film (PET film).

| | |
|---|---|
| Lelight SX-20 (France SEPPICNEL) | 50 g |
| 95% H$_2$SO$_4$ | 20 g |

(3) After coating application of the above etchant, the coating was left to stand for 10 seconds and washed with water to prepare an original plate with roughened surface.

EXAMPLE 5 (the method of forming a surface roughened pattern of resist on mask)

In the above Production Example 3, preparation of an original plate with roughened surface was performed according to the following method.

(1) On a Cr sputter mask having a predetermined pattern of a guide track width of 5 μm and an information track width of 10 μm formed on a glass plate according to photolithography, a posi-type photoresist was applied as a coating under the following conditions.
Spin coating: 2,000 rpm, 20 sec.
Resist: Sipley Microposit 1400
Thickness: 1.5 μm
(2) After coating, prebaking was effected at 90° C. for 20 minutes.
(3) Next, pattern exposure was effected from the glass side of the Cr mask under the following conditions.
Ultra-high-voltage mercury lamp: 4 KW (80 W/cm), 8 sec.
(4) Next, by the use of a ground glass (#4000), surface roughening exposure was effected under the following conditions with the glass closely contacting the resist side of the Cr mask.
Ultra-high-voltage mercury lamp: 4 KW (80 W/cm), 2 sec.
(5) After exposure, development was performed under the following conditions.
Dipped in Sipley Microposit developer for 60 seconds, and then, washed with water.
(6) Postbaking was effected at 90° C. for 20 minutes, whereby an original plate with roughened surface was obtained.

PRODUCTION EXAMPLE 6

Figure 17:
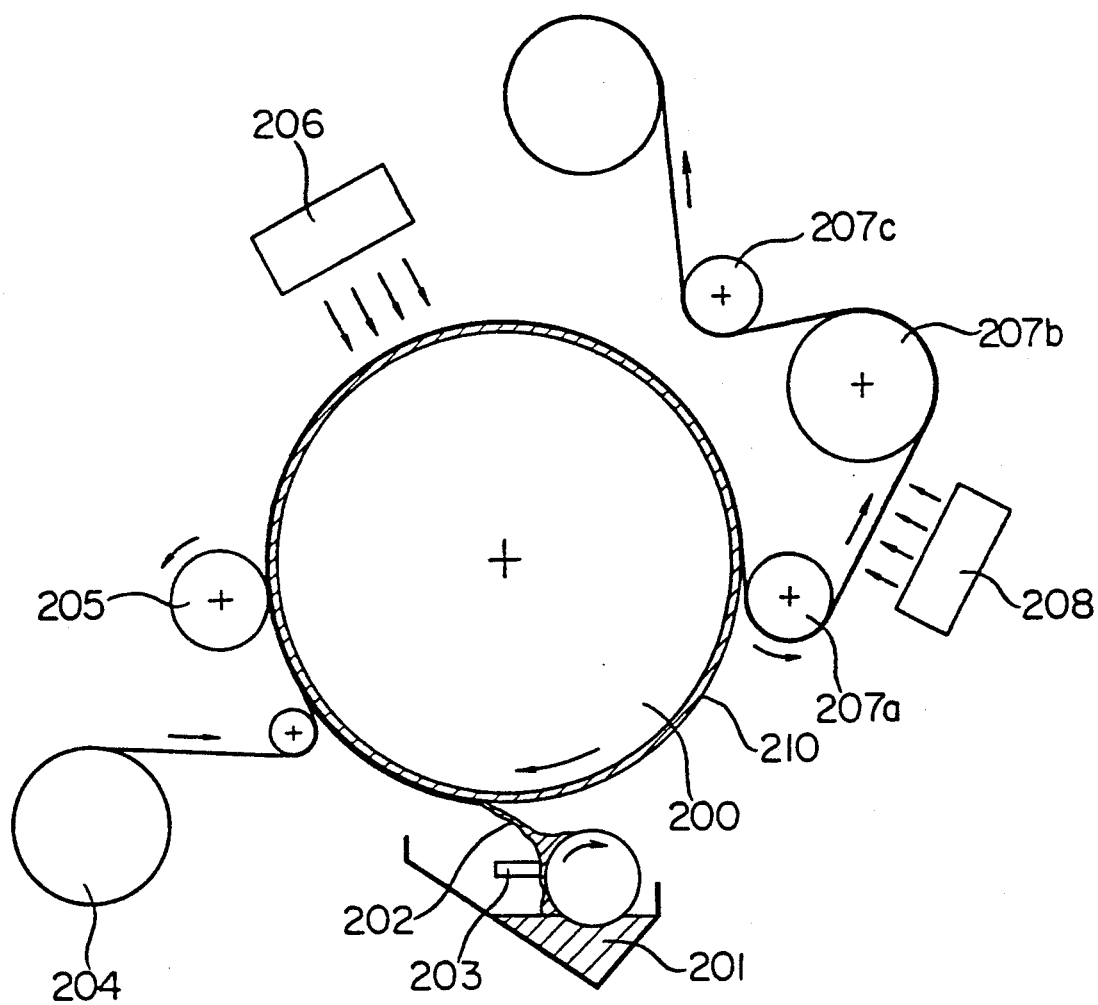
FIG. 17 is a schematic view of a device which can be used in the production steps of the optical recording member of the present invention.
Figure 18A:
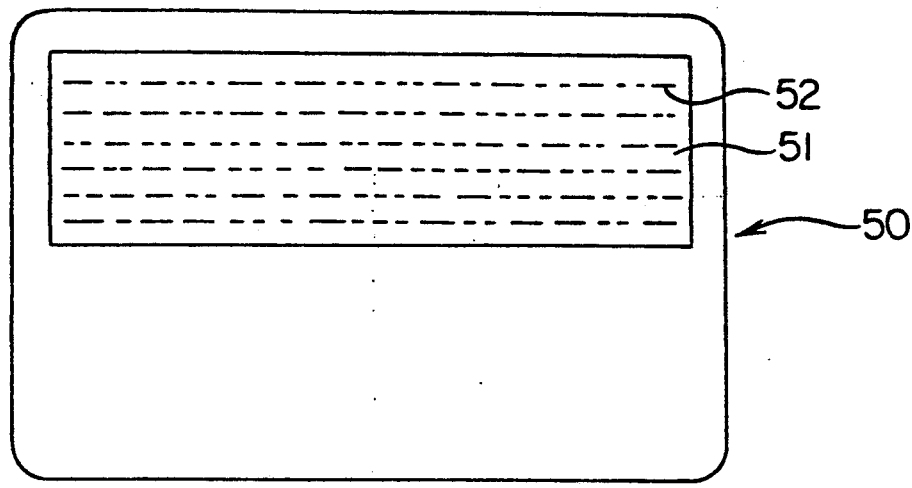
FIG. 18 shows an example of the optical card of the prior art, FIG. 18A being a plan view, FIG. 18B a sectional view.
Figure 18B:
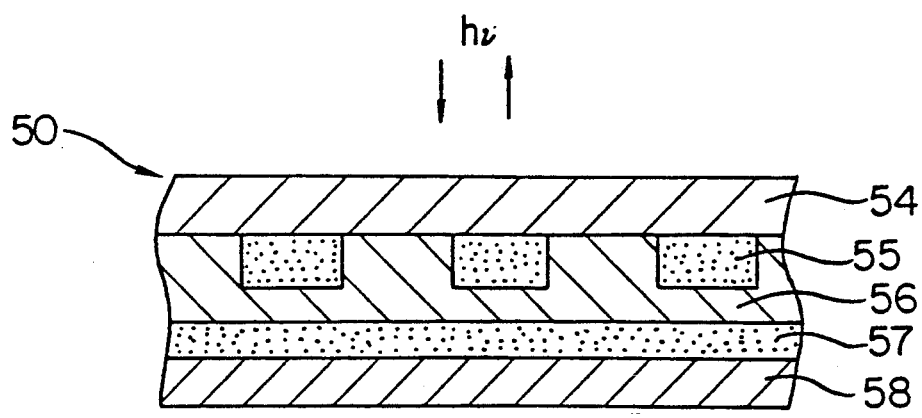
Figure 19:
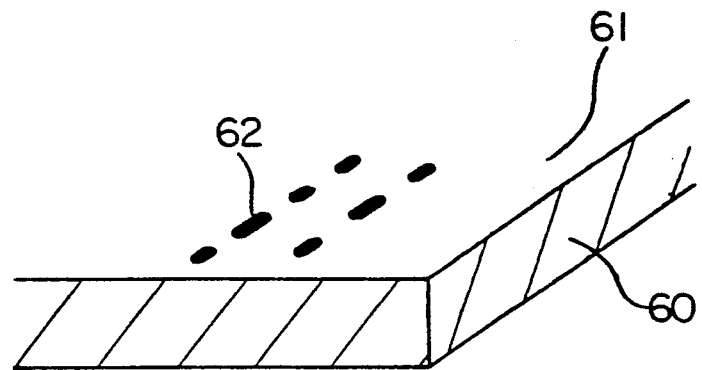
FIG. 19 is a perspective view showing another example of the optical card of the prior art.
Figure 20:
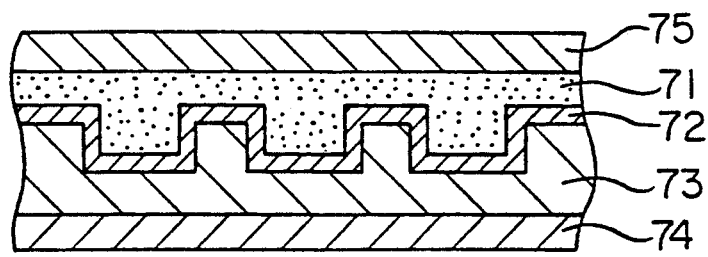
FIG. 20 is a sectional view showing another example of the optical card of the prior art.
Figure 21:
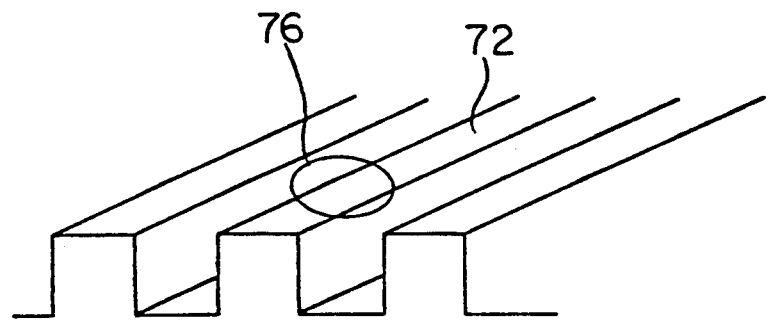
FIG. 21 is a diagram for illustration of the writing system in FIG. 20.
Figure 22:
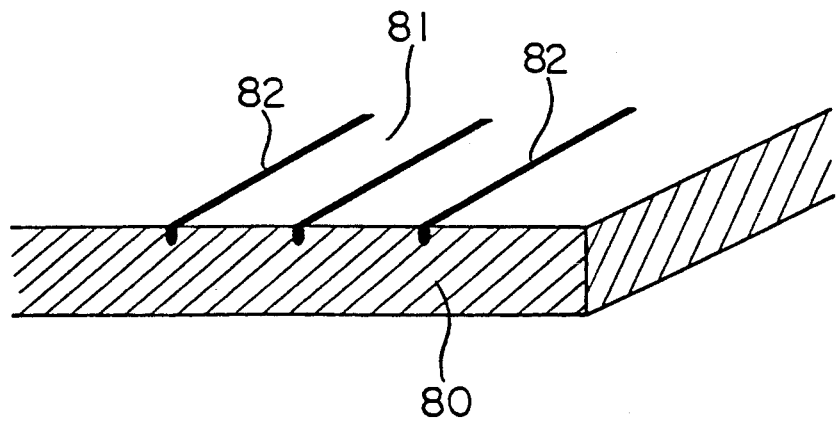
FIG. 22 is a perspective view showing another example of the optical recording member of the prior art.

The mother mask (second mask) 210 prepared in the above Production Example 3 was fixed by plastering at the circumference of the center drum 200 of the device shown in FIG. 17, and then a UV-curable resin 202 for copying was supplied from the ink pan 201 under rotation of the drum 200 to the mother mask 210 while being controlled by the doctor 203. On the other hand, a polycarbonate 204 was delivered and the polycarbonate was successively pressure bonded by means of a nip roll 205. Subsequently, UV-rays (2 KW) were projected from a UV lamp 206 to cure the resin, simultaneously with peeling off the mother mask 210 from the resin layer by utilizing the tension during wind-up by the guide roll 207a, which step was followed further by wind-up with optional irradiation with UV-rays by the UV lamp 208.

On the resin layer side of the optical recording member thus wound up, aluminum was vapor deposited at a rate of 10 m/min by means of a wind-up vapor deposition device (not shown), and further resist ink was printed by screen printing on the vapor deposited surface. Unnecessary portion were removed by etching, and subsequently a card base material was laminated by way of an adhesive. The composite was punched into a card shape, whereby a ROM type or DRAW type optical card could be continuously prepared.

EFFECT OF THE INVENTION

As described above, the optical recording member according to the present invention is an optical recording member comprising an information recording pattern having a different light reflectance to that of the surrounding formed on the substrate, and is constituted of a low reflectance portion which is a roughened surface portion having light scattering property, and therefore cumbersomeness of the step by etching, etc. can be avoided as far as possible, whereby the preparation steps can be simplified and also the optical recording material is not limited to specific materials with respect to the starting materials, and further, the process is also suitable for large volume copying on an industrial scale, thus having also excellent effect with respect to reduction in production cost.

Further, since the optical recording member according to the present invention has the constitution as described above, it is also excellent in long-term storability, durability and stability.

INDUSTRIAL APPLICABILITY

The optical recording member of the present invention can be utilized as the optical recording material of various forms such as flexible disc, card, tape, etc. and can be applied for, for example, uses as mentioned below.

(1) Monetary circulation industry: cashing card, credit card, prepaid card.

(2) Medical health industry: health certificate, clinical patient's card, medical card, emergency card.

(3) Leisure industry: software medium, membership card, admission ticket, medium for controlling play machine, medium for TV game, medium for orchestral accompaniment for amateur singers, golf score card.

(4) Transporting travel industry: traveler's card, certificate, pass, passport.

(5) Publication industry: electronic publication.

(6) information processing industry: external memory medium for electronic machine, filing.

(7) Education industry: teaching material program, performance management card, entrance and exit management and book management of library.

(8) Automobile industry: medium for maintenance recording, maintenance of running.

(9) FA: program recording medium for MC, NC, robot, etc.

(10) Others: building control, home control, ID card, medium for automatic vending machine, address card.

What is claimed is:

1. An optical recording medium, comprising:
   a base material;
   an information recording pattern formed on the base material, the information recording pattern being discriminable by differences in light reflectance, said information recording pattern comprising (i) a plurality of sets of optical recording tracks comprising a high reflectance portion and (ii) a plurality of sets of guide tracks comprising a low reflectance portion, said low reflectance portion comprising a roughened surface portion having light scattering property, and said high reflectance portion comprising a DRAW type optical recording region comprising a laminate of a first layer of an oxide of tellurium represented by the formula $TeO_x$, wherein $0<x<1.5$, and a second layer comprising an oxide of tellurium represented by the formula $TeO_y$, wherein $0.5<y<2$.

2. An optical recording member according to claim 1, wherein the low reflectance portions comprise photoresist portions.

3. An optical recording member according to claim 1, wherein the low reflectance portions comprise resin portions.

4. An optical recording member according to claim 1, wherein the low reflectance portions comprise portions of an ionized radiation curable resin.

5. An optical recording member according to claim 1, wherein the low reflectance portions comprise portions of a thermosetting resin.

6. An optical recording member according to claim 1, wherein the low reflectance portions are formed of a material which generates gas upon application of an energy thereto.

7. An optical recording member according to claim 1, wherein the information recording pattern comprises bit information.

8. An optical recording member according to claim 1, wherein the substrate comprises a glass, said low reflectance portions comprise the roughened surface portion of said glass substrate surface, and the high reflectance portions comprise portions of photoresist layer.

9. An optical recording medium according to claim 1, wherein the high reflectance portion comprises a light reflective material layer formed on at least part of the surface of the base material so as to cover the roughened surface portions together with the high reflectance portion, the light reflective material layer having a thickness which traces convex and concave portions of the surface of the roughened surface portion.

10. An optical recording member according to claim 9, wherein a card substrate is laminated over an adhesive layer on the surface of the optical recording member on the side of said light reflective material layer, while a transparent protective layer is laminated on the surface of the optical recording member on the side opposite to that where said light reflective material layer is provided.

11. An optical recording medium according to claim 9, wherein said light reflective material layer is formed on the entire surface of the base material.

12. An optical recording medium according to claim 1, wherein the high reflectance portion comprises a DRAW type optical recording material layer formed on at least part of the surface of the base material so as to cover the roughened surface portions together with the high reflectance portion, the DRAW type optical recording material layer having a thickness which traces convex and concave portions of the surface of the roughened surface portion.

13. An optical recording member according to claim 12, wherein a card substrate is laminated over an adhesive layer on the surface of the optical recording member on the side of said light reflective material layer, while a transparent protective layer is laminated on the surface of the optical recording member on the side opposite to that where said light reflective material layer is provided.

14. An optical recording medium according to claim 12, wherein said light reflective material layer is formed on the entire surface of the base material.

15. An optical recording medium according to claim 1, wherein $x<y$.

16. An optical recording medium according to claim 1, wherein said first layer is formed on said base material and said second layer is formed on said first layer.

* * * * *